US011610131B2

(12) United States Patent
Andoni et al.

(10) Patent No.: US 11,610,131 B2
(45) Date of Patent: *Mar. 21, 2023

(54) ENSEMBLING OF NEURAL NETWORK MODELS

(71) Applicant: SparkCognition, Inc., Austin, TX (US)

(72) Inventors: Sari Andoni, Austin, TX (US); Keith D. Moore, Cedar Park, TX (US); Elmira M. Bonab, Austin, TX (US); Junhwan Choi, Austin, TX (US); Tyler S. McDonnell, Austin, TX (US)

(73) Assignee: SPARKCOGNITION, INC., Austin, TX (US)

(*) Notice: Subject to any disclaimer, the term of this patent is extended or adjusted under 35 U.S.C. 154(b) by 353 days.

This patent is subject to a terminal disclaimer.

(21) Appl. No.: 16/811,632

(22) Filed: Mar. 6, 2020

(65) Prior Publication Data
US 2020/0210847 A1 Jul. 2, 2020

Related U.S. Application Data

(63) Continuation of application No. 15/794,980, filed on Oct. 26, 2017, now Pat. No. 10,635,978.

(51) Int. Cl.
G06N 3/08 (2006.01)
G06N 3/086 (2023.01)
G06N 3/084 (2023.01)

(52) U.S. Cl.
CPC ............ G06N 3/086 (2013.01); G06N 3/084 (2013.01)

(58) Field of Classification Search
None
See application file for complete search history.

(56) References Cited

U.S. PATENT DOCUMENTS

| 5,140,530 | A | 8/1992 | Guha et al. | |
| 6,721,647 | B1* | 4/2004 | Kita | G06N 3/126 700/48 |
| 2003/0050902 | A1 | 3/2003 | Buczak et al. | |
| 2005/0209982 | A1* | 9/2005 | Jin | G06N 3/126 706/19 |

(Continued)

OTHER PUBLICATIONS

Chandra et al, Evolutionary Framework for the Construction of Diverse Hybrid Ensembles, European Symposium on Artificial Neural Networks Bruges (Belgium) proceedings, Apr. 27-29, 2005 (Year: 2005).*

(Continued)

Primary Examiner — Ryan D. Coyer
(74) Attorney, Agent, or Firm — Moore IP Law

(57) ABSTRACT

A method includes determining, by a processor of a computing device, a subset of models included in a plurality of models generated based on a genetic algorithm and corresponds to a first epoch of the genetic algorithm. Each of the plurality of models includes data representative of a neural network. The method includes aggregating the subset of models to generate an ensembler. The ensembler, when executed on an input, provides at least a portion of the input to each model of the subset of models to generate a plurality of intermediate outputs. An ensembler output of the ensembler is based on the plurality of intermediate outputs. The method further includes executing the ensembler on input data to determine the ensembler output.

18 Claims, 11 Drawing Sheets

(56) References Cited

U.S. PATENT DOCUMENTS

| | | | |
|---|---|---|---|
| 2005/0246297 | A1 | 11/2005 | Chen et al. |
| 2005/0261953 | A1* | 11/2005 | Malek .................... G06Q 30/02 705/7.32 |
| 2007/0011114 | A1 | 1/2007 | Chen et al. |
| 2007/0208677 | A1 | 9/2007 | Goldberg et al. |
| 2019/0073591 | A1 | 3/2019 | Andoni et al. |
| 2019/0080240 | A1 | 3/2019 | Andoni et al. |
| 2019/0140160 | A1 | 5/2019 | Yoshikawa et al. |

OTHER PUBLICATIONS

Kourentzes et al, Neural network ensemble operators for time series forecasting, Expert Systems with Applications 41, 2014 (Year: 2014).*

Opitz et al, Generating Accurate and Diverse Members of a Neural Network Ensemble, Advances in neural information processing systems, 1996. (Year: 1996).*

Zhou et al, Ensembling Neural Networks: Many could be better than all, Artificial Intelligence 137, 2002 (Year: 2002).*

Arshad, J. et al, Wind Power Prediction using Genetic Programming based ensemble of Artificial Neural Networks (GPeANN), 12th International Conference on Frontiers of Information Technology, 2014, pgs.

Chandra et al., "Evolutionary Framework for the Construction of Diverse Hybrid Ensembles," European Symposium on Artificial Neural Networks Bruges (Belgium) proceedings, Apr. 27-29, 2005.

Chen et al., "Towards incremental learning of nonstationary imbalanced data stream: a multiple selectively recursive approach" (Year: 2011).

Fish et al., "Using an artificial neural network trained with a genetic algorithm to model brand share" (Year: 2004).

Galaviz, Jose, et al., "A Self-Adaptive Genetic Algorithm for Function Optimization", IEEE, Nov. 1996, 6 pgs.

Jakobovic, Domagoj, et al., "Adaptive Genetic Algorithm", Journal of Computing and Information Technology, CIT 7, 1999, 3, pp. 229-235.

Kourentzes et al., "Neural network ensemble operators for time series forecasting," Expert Systems with Applications 41, 2014.

Law, Nga L., et al., "Adaptive Genetic Algorithm with Mutation and Crossover Matrices", IJCAI-07, 2007, pp. 2330-2333.

Lei, Wang, et al., "An improved adaptive genetic algorithm and its application to image segmentation", Proc. SPIE 4550, Image Extraction, Segmentation, and Recognition, (Sep. 21, 2001), doi: 10.1117/12.441434, http://dx.doi.org/10.1117/12.441434, 8 pgs.

Opitz et al., "Generating Accurate and Diverse Members of a Neural Network Ensemble," Advances in neural information processing systems, 1996.

Pellerin, Eric, et al., "Self-adaptive parameters in genetic algorithms", Proc. SPIE 5433, Data Mining and Knowledge Discovery: Theory, Tools, and Technology VI, (Apr. 12, 2004), doi: 10.1117/12.542156, http://dx.doi.org/10.1117/12.542156, 12 pgs.

Yin et al., "DE2: Dynamic ensemble of ensembles for learning nonstationary data" (Year: 2015).

Zhou et al., "Ensembling Neural Networks: Many could be better than all," Artificial Intelligence 137, 2002.

* cited by examiner

Input set of N models at start of epoch J

Evaluate model fitness and cluster models into species based on genetic distance Determine species scores, identify "elite species," and remove stagnant species Identify "elite members" of "elite species" as well as "overall elites"

1000 ⤵

1002
Determine, by a processor of a computing device, a subset of models, the subset of models included in a plurality of models generated based on a genetic algorithm and corresponding to a first epoch of the genetic algorithm, where each of the plurality of models includes data representative of a neural network

1004
Aggregate the subset of models to generate an ensembler, where the ensembler, when executed on an input, provides at least a portion of the input to each model of the subset of models to generate a plurality of intermediate outputs, and where an ensembler output of the ensembler is based on the plurality of intermediate outputs

1006
Execute the ensembler on input data to determine the ensembler output

*FIG. 10*

ENSEMBLING OF NEURAL NETWORK MODELS

CROSS-REFERENCE TO RELATED APPLICATIONS

The present application claims priority to, and is a continuation of, U.S. patent application Ser. No. 15/794,980 entitled "ENSEMBLING OF NEURAL NETWORK MODELS," filed Oct. 26, 2017, the content of which is incorporated herein by reference in its entirety.

BACKGROUND

Computers are often used to solve complex quantitative and qualitative problems. For problems that involve a large data set, a specially trained professional, known as a data scientist, is often hired. The data scientist interprets the data set and constructs models that can be processed by computers to solve the problem. However, hiring data scientists is cost prohibitive for many organizations.

For certain types of problems, advanced computing techniques, such as genetic algorithms or backpropagation, may be available to develop a model, such as a neural network, that is comparable in accuracy to a model that would be created by a data scientist. However, genetic algorithms may take a large number of iterations to converge on an acceptable neural network, and backpropagation may be slow when a large data set is being modeled or when the neural network includes a large number of nodes, connections, or layers. Additionally, backpropagation may result in "overfitting" (e.g., a neural network generated by backpropagation may model the specific data set used for training, but may not be "general" enough to model other data sets within particular tolerances).

Furthermore, various types of machine-learning problems exist. For example, regression problems involve evaluating a series of inputs to predict a numeric output, classification problems involve evaluating a series of inputs to predict a categorical output, and reinforcement learning involves performing actions within an environment to optimize some notion of a positive reward. Due to the differences in the various types of problems, the available mechanisms to generate and train a neural network or other machine learning solution may be problem-specific. For example, a support vector machine (SVM) may be suitable for some classification problems, linear regression may be suitable for some regression problems, and a specialized machine learning platform, such as TensorFlow, may be suitable for reinforcement learning or other numerical calculations. Although a SVM, linear regression, and specialized machine learning platforms may solve specific machine-learning problems, at least some of these mechanisms may not be particularly suited to training neural networks. Thus, generating and training neural networks that meet performance requirements for each of multiple types of problems faced by an enterprise may be slow and difficult.

SUMMARY

The present application describes automated model building systems and methods that utilize a genetic algorithm to generate and train a neural network in a manner that is applicable to multiple types of machine-learning problems and to generate an ensembler that generates an output that is based on outputs of multiple neural networks. To illustrate, the described automated model building techniques may enable a generalized approach to generating neural networks that can be applied for regression, classification, and reinforcement learning problems. Using the ensembler may enable generation of an output that is more general than the output of a particular neural network (because the output of the ensembler is based on outputs of multiple neural networks), and thus the ensembler may be used to mitigate overfitting concerns. Additionally, or alternatively, the ensembler may be provided as an element of an input set to an epoch of the genetic algorithm, which may cause the genetic algorithm to converge faster or to output a neural network having a higher fitness than a genetic algorithm that does not use an ensembler.

As an illustrative, non-limiting example, consider a home with four temperature sensors that periodically collect temperature readings in the living room (L), the dining room (D), the master bedroom (M), and the guest bedroom (G), respectively. In this example, a data set may include four columns, where each column corresponds to temperature readings from a particular sensor in a particular room, and where each row corresponds to a particular time at which the four sensors took a temperature reading. It may be of interest to predict the temperature in one of the rooms, e.g., L, given the temperature in the other three rooms, e.g., D, M, and G. A neural network may be suitable for such a problem, where the neural network has D, M, and/or G as input nodes and L as an output node. For example, a neural network that predicts an output value of L with 90% accuracy given input values of D, M, and/or G may be an acceptable solution.

In accordance with the described techniques, a genetic algorithm may be executed to generate and train a neural network. Genetic algorithms are iterative adaptive search heuristics inspired by biological natural selection. The genetic algorithm may start with a population of random models that each define a neural network with different topology, weights and activation functions. Over the course of several epochs (also known as generations), the models may be evolved using biology-inspired reproduction operations, such as crossover (e.g., combining characteristics of two neural networks), mutation (e.g., randomly modifying a characteristic of a neural network), stagnation/extinction (e.g., removing neural networks whose accuracy has not improved in several epochs), and selection (e.g., identifying the best performing neural networks via testing).

During at least one epoch, multiple models may be aggregated to form an ensembler. In this context, an "ensembler" is a data structure that links multiple models with an ensembling function. The ensembling function is applied to the outputs of the models (e.g., intermediate outputs) to generate an ensembler output of the ensembler. For example, models having highest overall fitness values, models having highest fitness value per species, or both, may be aggregated to form the ensembler. The ensembling function may include any mathematical or logical function, such as an average, a mode, a voting function, etc. As a particular, non-limiting example, five models associated with highest fitness values for a particular epoch of a genetic algorithm may be aggregated together, and a mode function may be applied to the outputs of the five models to generate an ensembler output. In this example, the ensembler output may mitigate overfitting concerns associated with a particular model because the ensembler output is based on outputs of multiple models (e.g., multiple neural networks) instead of a single model. In some implementations, the ensembler may be provided as an output of the genetic algorithm, and the ensembler may provide a more generalized output based on input data than a single neural network generated during execution of the genetic algorithm. Alternatively, the ensembler may be generated during a particular epoch of the genetic algorithm and may be provided as in input to a subsequent epoch. In this implementation, the ensembler is treated as another model that is potentially evolved using one or more genetic operations and that may cause the genetic algorithm to converge to a solution (e.g., a particular neural network) faster.

In addition, the best performing models of an epoch may be selected for reproduction to generate a trainable model. The trainable model may be trained using backpropagation to generate a trained model. Although described as backpropagation training, any combination of a genetic algorithm and an optimization algorithm such as backpropagation, a derivative free optimizer (DFO), an extreme learning machine (ELM) or similar optimizer may be used to generate and then train a neural network. In some implementations, an optimization trainer may train a particular genetic trait, such as weight. In other implementations, the optimization trainer may train a topological parameter indicative of a neural network topology, such as a number of nodes, a number of connections, or other topological parameters as further described herein. As an example, the optimization trainer may include a reinforcement learning agent that is trained in parallel to execution of the genetic algorithm. In this example, the reinforcement learning agent may be configured to tune topological substructures (e.g., topological parameters), and a reward signal of the reinforcement learning agent may be based on (e.g., derived from) a difference in fitness between a randomly evolved neural network and a particular neural network that is evolved by the reinforcement learning agent (including one or more topological parameters that are tweaked by the reinforcement learning agent). In other implementations, the optimization trainer may include or correspond to other optimization techniques or algorithms.

It is to be understood that characterization of any system components of method steps as "optimizers" or "optimization trainers," and use of such terminology herein, is not to be interpreted as requiring such components or steps to generate optimal results to the extreme (e.g., 100% prediction or classification accuracy). Rather, use of such terms is to be interpreted as indicating an attempt generate an output that is improved in some fashion relative to an input. For example, an optimization trainer that receives a trainable model as input and outputs a trained model may attempt to improve a prediction or classification accuracy of the trainable model by modifying one or more attributes of the trainable model to generate the trained model. When the trained model is available, the trained model may be re-inserted into the genetic algorithm for continued evolution. Training a model that is generated by breeding the best performing population members of an epoch may serve to reinforce desired "genetic traits" (e.g., neural network topology, activation functions, connection weights, etc.), and introducing the trained model back into the genetic algorithm may lead the genetic algorithm to converge to an acceptably accurate solution (e.g., neural network) faster, for example because desired "genetic traits" are available for inheritance in later epochs of the genetic algorithm. In some implementations, an ensembler may be trained using backpropagation training, and the trained ensembler may be introduced back into the genetic algorithm to cause the genetic algorithm to converge to an acceptably accurate solution faster.

A computer system in accordance with the present disclosure may include a memory that stores an input data set and a plurality of data structures. For example, each data structure may be a model of a neural network that models the input data set. The computer system may also include at least one processor that is configured to execute a recursive search. For example, the recursive search may be a genetic algorithm to generate a neural network that best models the input data set. During a first iteration of the recursive search, the processor may determine a fitness value for each of the data structures (e.g., neural network models) based on at least a subset of the input data set. The processor may also determine a subset of data structures from the plurality of data structures based on their respective fitness values. The processor may aggregate the subset of data structures to generate an ensembler. The ensembler, when executed on an input, provides at least a portion of the input to each data structure of the subset of data structures to generate a plurality of intermediate outputs. An ensembler output of the ensembler is based on the plurality of intermediate outputs. The processor may further execute the ensembler on the input data set to determine the ensembler output.

BRIEF DESCRIPTION OF THE DRAWINGS

FIG. 10 illustrates a particular example of a method of generating an ensembler using models of a genetic algorithm.

DETAILED DESCRIPTION

Figure 1:
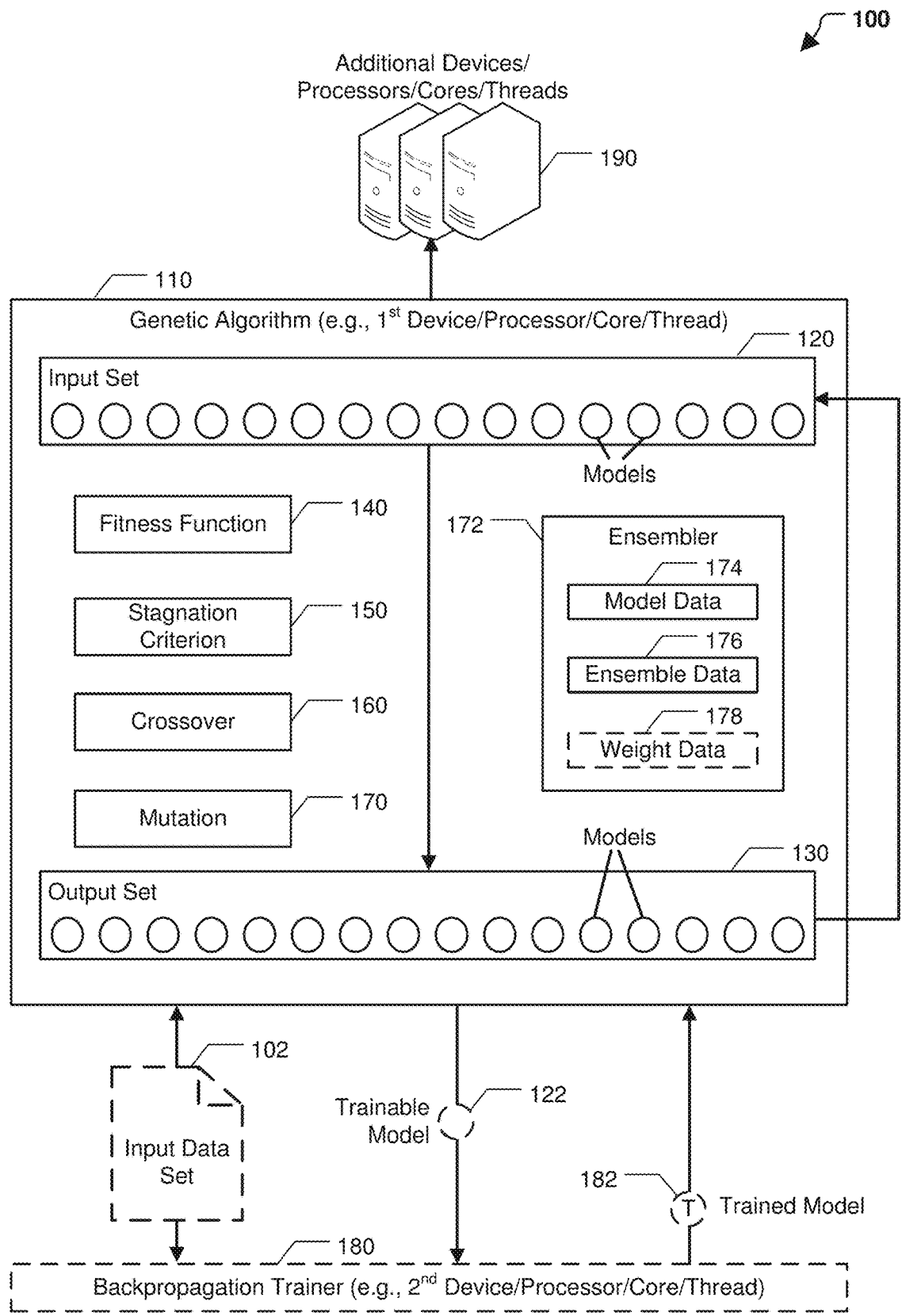
FIG. 1 illustrates a particular example of a system that is operable to support execution of a genetic algorithm that generates at least one ensembler.

Referring to FIG. 1, a particular illustrative example of a system 100 is shown. The system 100, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the system 100 includes a genetic algorithm 110. In some implementations, the system 100 further includes a backpropagation trainer 180. In other implementations, the system 100 does not include the backpropagation trainer 180. The backpropagation trainer 180 is an example of an optimization trainer, and other examples of optimization trainers that may be used in conjunction with the described techniques include, but are not limited to, a derivative free optimizer (DFO), an extreme learning machine (ELM), etc.

It is to be understood that operations described herein as being performed by the genetic algorithm 110 or the backpropagation trainer 180 may be performed by a device executing the genetic algorithm 110 or the backpropagation trainer 180. In particular aspects, the genetic algorithm 110 is executed on a different device, processor (e.g., central processor unit (CPU), graphics processing unit (GPU) or other type of processor), processor core, and/or thread (e.g., hardware or software thread) than the backpropagation trainer 180. Moreover, execution of certain operations associated with the genetic algorithm 110 or the backpropagation trainer 180 may be parallelized, as further described herein.

The genetic algorithm 110 may automatically generate a neural network model of a particular data set, such as an illustrative input data set 102. The system 100 may provide an automated model building process that enables even inexperienced users to quickly and easily build highly accurate models based on a specified data set. Additionally, the system 100 may simplify the neural network model to avoid overfitting and to reduce computing resources required to run the model.

The genetic algorithm 110 includes or is otherwise associated with a fitness function 140, a stagnation criterion 150, a crossover operation 160, and a mutation operation 170. Although the fitness function 140 is described herein, in other implementations, the genetic algorithm 110 may include or otherwise be associated with other objective criteria (referred to herein as "diversity metrics"). The diversity metrics may indicate whether a neural network performs "well" (e.g., within a target range) in a manner that is not recognized or described by overall fitness. For example, a diversity metric may indicate whether a neural network assigns correct classifications for minority classes in a classification problem, or whether the neural network recognizes "peculiarities" (e.g., outliers) in an input data set, as non-limiting examples. In other implementations, the diversity metrics may capture other characteristics that are not explicitly captured by error-rate (e.g., fitness) or topological parameters. As described above, the genetic algorithm 110 may represent a recursive neuroevolutionary search process. During each iteration of the search process (also called an "epoch" or a "generation" of the genetic algorithm 110), an input set (or population) 120 may be "evolved" to generate an output set (or population) 130. The input set 120 of an initial epoch of the genetic algorithm 110 may be randomly or pseudo-randomly generated. After that, the output set 130 of one epoch may be the input set 120 of the next (non-initial) epoch, as further described herein.

The input set 120 and the output set 130 may each include a plurality of models, where each model includes data representative of a neural network. For example, each model may specify a neural network by at least a neural network topology, a series of activation functions, and connection weights. The topology of a neural network may include a configuration of nodes of the neural network and connections between such nodes. In a particular implementation, each model may specify a neural network by at least a plurality of layers (e.g., input layers, hidden layers, and output layers) and connections between the plurality of layers. The models may also be specified to include other parameters, including but not limited to bias values/functions and aggregation functions.

Figure 2:
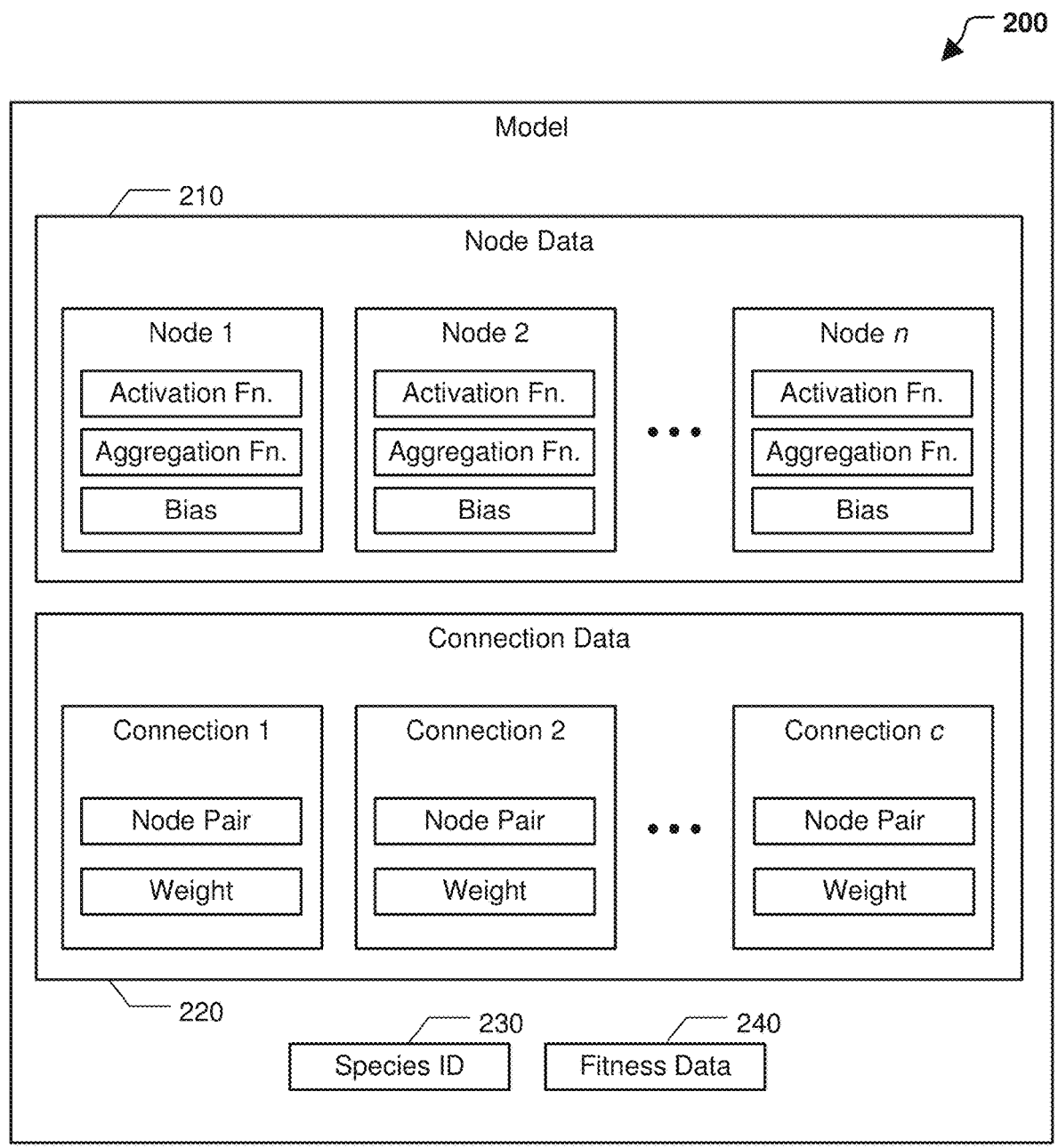
FIG. 2 illustrates a particular example of a model including data representative of a neural network.

Additional examples of neural network models are further described with reference to FIG. 2. In particular, as shown in FIG. 2, a model 200 may be a data structure that includes node data 210 and connection data 220. In the illustrated example, the node data 210 for each node of a neural network may include at least one of an activation function, an aggregation function, or a bias (e.g., a constant bias value or a bias function). The activation function of a node may be a step function, sine function, continuous or piecewise linear function, sigmoid function, hyperbolic tangent function, or other type of mathematical function that represents a threshold at which the node is activated. The biological analog to activation of a node is the firing of a neuron. The aggregation function may be a mathematical function that combines (e.g., sum, product, etc.) input signals to the node. An output of the aggregation function may be used as input to the activation function. The bias may be a constant value or function that is used by the aggregation function and/or the activation function to make the node more or less likely to be activated.

The connection data 220 for each connection in a neural network may include at least one of a node pair or a connection weight. For example, if a neural network includes a connection from node N1 to node N2, then the connection data 220 for that connection may include the node pair <N1, N2>. The connection weight may be a numerical quantity that influences if and/or how the output of N1 is modified before being input at N2. In the example of a recurrent network, a node may have a connection to itself (e.g., the connection data 220 may include the node pair <N1, N1>).

The model 200 may also include a species identifier (ID) 230 and fitness data 240. The species ID 230 may indicate which of a plurality of species the model 200 is classified in, as further described with reference to FIG. 3. The fitness data 240 may indicate how well the model 200 models the input data set 102. For example, the fitness data 240 may include a fitness value that is determined based on evaluating the fitness function 140 with respect to the model 200, as further described herein.

Additionally, or alternatively, the model 200 may be included in or correspond to a layer (e.g., a plurality of neural network models) having associated "layer parameters." As used herein, "layer parameter" may specify a layer type of each layer (or each hidden layer). Examples of layer types include long short-term memory (LSTM) layers, gated recurrent units (GRU) layers, fully connected layers, and convolutional neural network (CNN) layers. Other types of layer parameters include a number of input nodes (e.g., within the layer) and connections between the layer and other layers. In some implementations, the number of input nodes refers to a number of input nodes that are in use (e.g., connected to) one or more hidden layers. In still other implementations, the layer parameters may include (or indicate) any neural network substructure that is larger than a node. As one example, a network substructure may include an encapsulation of a CNN layer and a pooling layer (e.g., a "CNN+pooling" layer subset). In other examples, the encapsulation may include other layer types. In some implementations, an archive of models that are generated using the genetic algorithm 110 may be maintained, and application of a learning mechanism to the archive may identify one or more network substructures (e.g., blueprints) that tend to provide benefits for certain classes of problems, and thus would be useful to introduce when executing the genetic algorithm 110 to train a neural network that solves one of the certain classes of problems. In some implementations, the layer parameters may be grouped with or included within the topology parameters (e.g., parameters associated with particular neural network models). In other implementations, layer parameters are distinct from and are dealt with separately from the topology parameters.

Returning to FIG. 1, the fitness function 140 may be an objective function that can be used to compare the models of the input set 120. In some examples, the fitness function 140 is based on a frequency and/or magnitude of errors produced by testing a model on the input data set 102. As a simple example, assume a test portion of the input data set 102 includes ten rows, that the input data set 102 includes two columns denoted A and B, and that the models illustrated in FIG. 1 represent neural networks that output a predicted a value of B given an input value of A. In this example, testing a model may include inputting each of the ten values of A from the input data set 102, comparing the predicted values of B to the corresponding actual values of B from the input data set 102, and determining if and/or by how much the two predicted and actual values of B differ. To illustrate, if a particular neural network correctly predicted the value of B for nine of the ten rows, then a relatively simple fitness function (e.g., the fitness function 140) may assign the corresponding model a fitness value of 9/10=0.9. It is to be understood that the previous example is for illustration only and is not to be considered limiting. In some aspects, the fitness function 140 may also, or in the alternative, be based on factors unrelated to error frequency or error rate, such as number of input nodes, node layers, hidden layers, connections, computational complexity, etc. In still other implementations, the fitness function 140 may also, or in the alternative, be based on one or more diversity metrics. As non-limiting examples, the diversity metrics may indicate whether a neural network performs "well" (e.g., within a target range) on minority classes in a classification problem or whether the neural network recognizes "peculiarities" (e.g., outliers) in an input data set. Improving the diversity metrics of neural networks may result in generation of neural networks having different topological parameter values (or other parameter values) than the neural networks that are generated based on the fitness function 140. These neural networks may prevent stagnation in one or more species.

In a particular aspect, fitness evaluation of models may be performed in parallel. To illustrate, the system 100 may include additional devices, processors, cores, and/or threads 190 to those that execute the genetic algorithm 110 and the backpropagation trainer 180. These additional devices, processors, cores, and/or threads 190 may test model fitness in parallel based on the input data set 102 and may provide the resulting fitness values to the genetic algorithm 110.

In a particular aspect, the genetic algorithm 110 may be configured to perform speciation. For example, the genetic algorithm 110 may be configured to cluster the models of the input set 120 into species based on "genetic distance" between the models. Because each model represents a neural network, the genetic distance between two models may be based on differences in nodes, activation functions, aggregation functions, connections, connection weights, etc. of the two models. In an illustrative example, the genetic algorithm 110 may be configured to serialize a model into a bit string. In this example, the genetic distance between models may be represented by the number of differing bits in the bit strings corresponding to the models. The bit strings corresponding to models may be referred to as "encodings" of the models. Speciation is further described with reference to FIG. 3.

Because the genetic algorithm 110 is configured to mimic biological evolution and principles of natural selection, it may be possible for a species of models to become "extinct." The stagnation criterion 150 may be used to determine when a species should become extinct, e.g., when the models in a species are to be removed from the genetic algorithm 110. Stagnation is further described with reference to FIG. 4.

The crossover operation 160 and the mutation operation 170 is highly stochastic under certain constraints and a defined set of probabilities optimized for model building, which produces reproduction operations that can be used to generate the output set 130, or at least a portion thereof, from the input set 120. In a particular aspect, the genetic algorithm 110 utilizes intra-species reproduction but not inter-species reproduction in generating the output set 130. Including intra-species reproduction and excluding inter-species reproduction may be based on the assumption that because they share more genetic traits, the models of a species are more likely to cooperate and will therefore more quickly converge on a sufficiently accurate neural network. In some examples, inter-species reproduction may be used in addition to or instead of intra-species reproduction to generate the output set 130. Crossover and mutation are further described with reference to FIG. 7.

During at least some epochs of the genetic algorithm 110, the genetic algorithm 110 may aggregate multiple models to form an ensembler 172. The ensembler 172 may represent multiple models that are configured to receive input and to generate a plurality of intermediate outputs. In some implementations, the multiple models include models of neural networks, as described with reference to the model 200 of FIG. 2. In a particular implementation, the multiple models are generated during an epoch of the genetic algorithm 110. Alternatively, the genetic algorithm 110 may be executed multiple times with different configuration parameters, and the multiple models include the models (e.g., the final output models) output by the multiple executions of the genetic algorithm 110. Additionally, or alternatively, the models generated during the epoch of the genetic algorithm 110 (or the models output by the multiple executions of the genetic algorithm 110) may be ensemblers, and the ensembler 172 may include a plurality of ensemblers. The ensembler 172 may further represent an ensembling function that is applied to the plurality of intermediate outputs to generate an ensembler output of the ensembler 172. To illustrate, the ensembler 172 may include model data 174 indicative of the models included in the ensembler 172 and ensemble data 176 indicative of the ensembling function. The ensembling function may include an average, a mode, or a voting function, as non-limiting examples. In some implementations, the ensembler 172 further includes weight data 178 indicative of weights applied to the plurality of intermediate outputs. The weights may be based on fitness values, species scores, other values, or a combination thereof. In a particular implementation, the ensembler 172 is provided along with a selected neural network as an output of the genetic algorithm 110. Alternatively, the ensembler 172 is generated during a first epoch of the genetic algorithm and is provided as an input to a second epoch of the genetic algorithm 110 that is subsequent to the first epoch. The ensembler 172 is further described with reference to FIG. 5.

Left alone and given time to execute enough epochs, the genetic algorithm 110 may be capable of generating a model (and by extension, a neural network) that meets desired accuracy requirements. However, because genetic algorithms utilize randomized selection, it may be overly time-consuming for a genetic algorithm to arrive at an acceptable neural network. To illustrate, it may be possible for the "traits" of an unreliable neural network to survive for several epochs of the genetic algorithm 110, which may delay convergence of the genetic algorithm 110 on a reliable and accurate neural network that models the input data set 102.

In some implementations, to "help" the genetic algorithm 110 arrive at a solution faster, a model may occasionally be sent from the genetic algorithm 110 to the backpropagation trainer 180 for training. This model is referred to herein as a trainable model 122. In particular, the trainable model 122 may be based on crossing over and/or mutating the fittest models of the input set 120, as further described with reference to FIG. 6. Thus, the trainable model 122 may not merely be a genetically "trained" file produced by the genetic algorithm 110. Rather, the trainable model 122 may represent an advancement with respect to the fittest models of the input set 120. Additionally, or alternatively, the ensembler 172 may be provided to the backpropagation trainer 180.

The backpropagation trainer 180 may utilize a portion, but not all of the input data set 102 to train the connection weights of the trainable model 122, thereby generating a trained model 182. For example, the portion of the input data set 102 may be input into the trainable model 122, which may in turn generate output data. The input data set 102 and the output data may be used to determine an error value, and the error value may be used to modify connection weights of the model, such as by using gradient descent or another function.

The backpropagation trainer 180 may train using a portion rather than all of the input data set 102 to mitigate overfitting concerns and/or to shorten training time. The backpropagation trainer 180 may leave aspects of the trainable model 122 other than connection weights (e.g., neural network topology, activation functions, etc.) unchanged. Backpropagating a portion of the input data set 102 through the trainable model 122 may serve to positively reinforce "genetic traits" of the fittest models in the input set 120 that were used to generate the trainable model 122. Because the backpropagation trainer 180 may be executed on a different device, processor, core, and/or thread than the genetic algorithm 110, the genetic algorithm 110 may continue executing additional epoch(s) while the connection weights of the trainable model 122 are being trained. When training is complete, the trained model 182 may be input back into (a subsequent epoch of) the genetic algorithm 110, so that the positively reinforced "genetic traits" of the trained model 182 are available to be inherited by other models in the genetic algorithm 110. Use of the backpropagation trainer 180 is optional and is not intended to be limiting. In a particular implementation, the backpropagation trainer 180 may be configured to train the trainable model 122 to respond to a particular subset of an input data set, instead of to respond generally to the input data set. For example, in a classification problem with multiple output classes, the backpropagation trainer 180 may train a first trainable model using a first subset of an input data set to generate a first trained model that represents with a high confidence the first subset of the input data set. The backpropagation trainer 180 may also be configured to train a second trainable model using a second subset of the input data set to generate a second trained model that represents with high confidence that second subset of the input data set. The backpropagation trainer 180 may be configured to output additional trained models based on other subsets of the input data set, and the first trained model, the second trained model, and the other trained models may be used to form the ensembler 172 such that the ensembler 172 represents each subset of the input data set with high confidence.

Operation of the system 100 is now described with reference to FIGS. 3-8. It is to be understood, however, that in alternative implementations certain operations may be performed in a different order than described. Moreover, operations described as sequential may be instead be performed at least partially concurrently, and operations described as being performed at least partially concurrently may instead be performed sequentially.

During a configuration stage of operation, a user may specify the input data set 102 and may specify a particular data field or a set of data fields in the input data set 102 to be modeled. The data field(s) to be modeled may correspond to output nodes of a neural network that is to be generated by the system 100. For example, if a user indicates that the value of a particular data field is to be modeled (e.g., to predict the value based on other data of the data set), the model may be generated by the system 100 to include an output node that generates an output value corresponding to a modeled value of the particular data field. In particular implementations, the user can also configure other aspects of the model. For example, the user may provide input to indicate a particular data field of the data set that is to be included in the model or a particular data field of the data set that is to be omitted from the model. As another example, the user may provide input to constrain allowed model topologies. To illustrate, the model may be constrained to include no more than a specified number of input nodes, no more than a specified number of hidden layers, or no recurrent loops.

Further, in particular implementations, the user can configure aspects of the genetic algorithm 110. For example, the user may provide input to limit a number of epochs that will be executed by the genetic algorithm 110. Alternatively, the user may specify a time limit indicating an amount of time that the genetic algorithm 110 has to generate the model, and the genetic algorithm 110 may determine a number of epochs that will be executed based on the specified time limit. To illustrate, an initial epoch of the genetic algorithm 110 may be timed (e.g., using a hardware or software timer at the computing device executing the genetic algorithm 110), and a total number of epochs that are to be executed within the specified time limit may be determined accordingly. As another example, the user may constrain a number of models evaluated in each epoch, for example by constraining the size of the input set 120 and/or the output set 130. As yet another example, the user can define a number of trainable models 122 to be trained by the backpropagation trainer 180 and fed back into the genetic algorithm 110 as trained models 182. As another example, the user can define a number of models to be aggregated to form the ensembler 172. As another example, the user can select a characteristic to use as the basis for the weight data 178. As yet another example, the user can select the ensembling function indicated by the ensemble data 176.

In particular aspects, configuration of the genetic algorithm 110 also includes performing pre-processing steps based on the input data set 102. For example, the system 100 may determine, based on the input data set 102 and/or user input, whether a neural network is to be generated for a regression problem, a classification problem, a reinforcement learning problem, etc. As another example, the input data set 102 may be "cleaned" to remove obvious errors, fill in data "blanks," etc. As another example, values in the input data set 102 may be scaled (e.g., to values between 0 and 1). As yet another example, non-numerical data (e.g., categorical classification data or Boolean data) may be converted into numerical data.

After the above-described configuration stage, the genetic algorithm 110 may automatically generate an initial set of models based on the input data set 102, received user input indicating (or usable to determine) the type of problem to be solved, etc. (e.g., the initial set of models is data-driven). As illustrated in FIG. 2, each model may be specified by at least a neural network topology, an activation function, and link weights. The neural network topology may indicate an arrangement of nodes (e.g., neurons). For example, the neural network topology may indicate a number of input nodes, a number of hidden layers, a number of nodes per hidden layer, and a number of output nodes. The neural network topology may also indicate the interconnections (e.g., axons or links) between nodes.

The initial set of models may be input into an initial epoch of the genetic algorithm 110 as the input set 120, and at the end of the initial epoch, the output set 130 generated during the initial epoch may become the input set 120 of the next epoch of the genetic algorithm 110. In some examples, the input set 120 may have a specific number of models. For example, as shown in a first stage 300 of operation in FIG. 3, the input set may include 200 models. It is to be understood that alternative examples may include a different number of models in the input set 120 and/or the output set 130.

For the initial epoch of the genetic algorithm 110, the topologies of the models in the input set 120 may be randomly or pseudo-randomly generated within constraints specified by any previously input configuration settings. Accordingly, the input set 120 may include models with multiple distinct topologies. For example, a first model may have a first topology, including a first number of input nodes associated with a first set of data parameters, a first number of hidden layers including a first number and arrangement of hidden nodes, one or more output nodes, and a first set of interconnections between the nodes. In this example, a second model may have a second topology, including a second number of input nodes associated with a second set of data parameters, a second number of hidden layers including a second number and arrangement of hidden nodes, one or more output nodes, and a second set of interconnections between the nodes. Since the first model and the second model are both attempting to model the same data field(s), the first and second models have the same output nodes.

The genetic algorithm 110 may automatically assign an activation function, an aggregation function, a bias, connection weights, etc. to each model of the input set 120 for the initial epoch. In some aspects, the connection weights are assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes of a model may have different types of activation functions. In other implementations, the activation function assigned to each node (or each layer) may be randomly or pseudo-randomly selected (from the set of allowed activation functions). Aggregation functions may similarly be randomly or pseudo-randomly assigned for the models in the input set 120 of the initial epoch. Thus, the models of the input set 120 of the initial epoch may have different topologies (which may include different input nodes corresponding to different input data fields if the data set includes many data fields) and different connection weights. Further, the models of the input set 120 of the initial epoch may include nodes having different activation functions, aggregation functions, and/or bias values/functions.

Continuing to a second stage 350 of operation, each model of the input set 120 may be tested based on the input data set 102 to determine model fitness. For example, the input data set 102 may be provided as input data to each model, which processes the input data set (according to the network topology, connection weights, activation function, etc., of the respective model) to generate output data. The output data of each model may be evaluated using the fitness function 140 to determine how well the model modeled the input data set 102. For example, in the case of a regression problem, the output data may be evaluated by comparing a prediction value in the output data to an actual value in the input data set 102. As another example, in the case of a classification problem, a classifier result indicated by the output data may be compared to a classification associated with the input data set 102 to determine if the classifier result matches the classification in the input data set 102. As yet another example, in the case of a reinforcement learning problem, a reward may be determined (e.g., calculated) based on evaluation of an environment, which may include one or more variables, functions, etc. In a reinforcement learning problem, the fitness function 140 may be the same as or may be based on the reward function(s). Fitness of a model may be evaluated based on performance (e.g., accuracy) of the model, complexity (or sparsity) of the model, or a combination thereof. As a simple example, in the case of a regression problem or reinforcement learning problem, a fitness value may be assigned to a particular model based on an error value associated with the output data of that model or based on the value of the reward function, respectively. As another example, in the case of a classification problem, the fitness value may be assigned based on whether a classification determined by a particular model is a correct classification, or how many correct or incorrect classifications were determined by the model. Additionally, or alternatively, the fitness of the model may be determined based on one or more diversity metrics.

In a more complex example, the fitness value may be assigned to a particular model based on both prediction/classification accuracy or reward optimization as well as complexity (or sparsity) of the model. As an illustrative example, a first model may model the data set well (e.g., may generate output data or an output classification with a relatively small error, or may generate a large positive reward function value) using five input nodes (corresponding to five input data fields), whereas a second potential model may also model the data set well using two input nodes (corresponding to two input data fields). In this illustrative example, the second model may be sparser (depending on the configuration of hidden nodes of each network model) and therefore may be assigned a higher fitness value that the first model.

Figure 3:
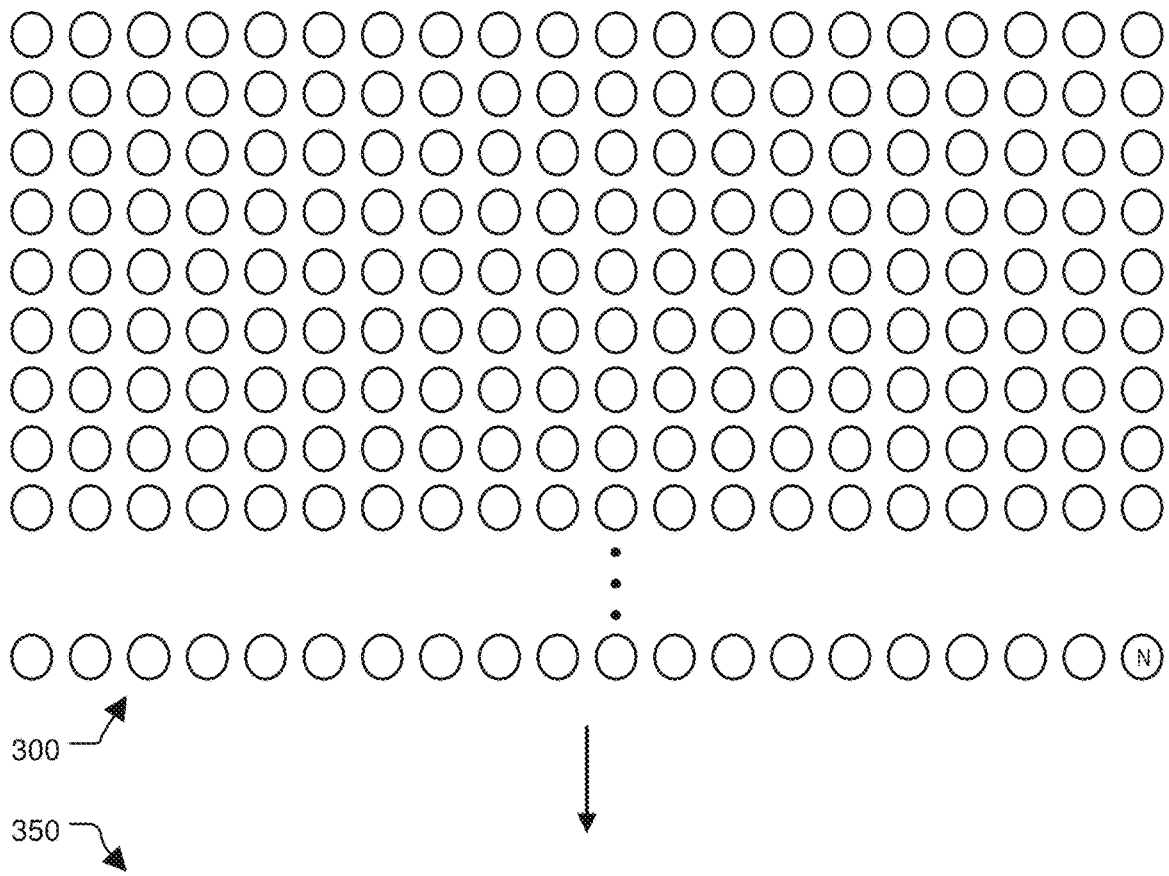
FIG. 3 illustrates particular examples of first and second stages of operation at the system of FIG. 1.
Figure 3:
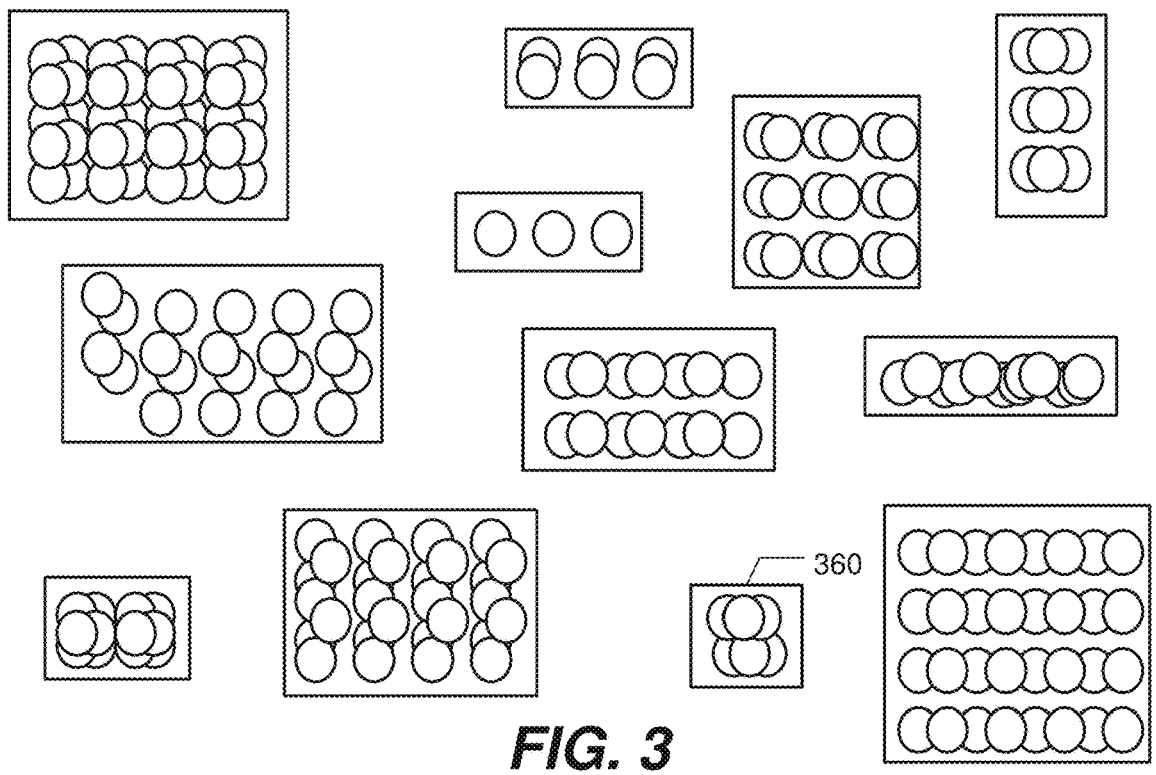

As shown in FIG. 3, the second stage 350 may include clustering the models into species based on genetic distance. In a particular aspect, the species ID 230 of each of the models may be set to a value corresponding to the species that the model has been clustered into.

Figure 4:
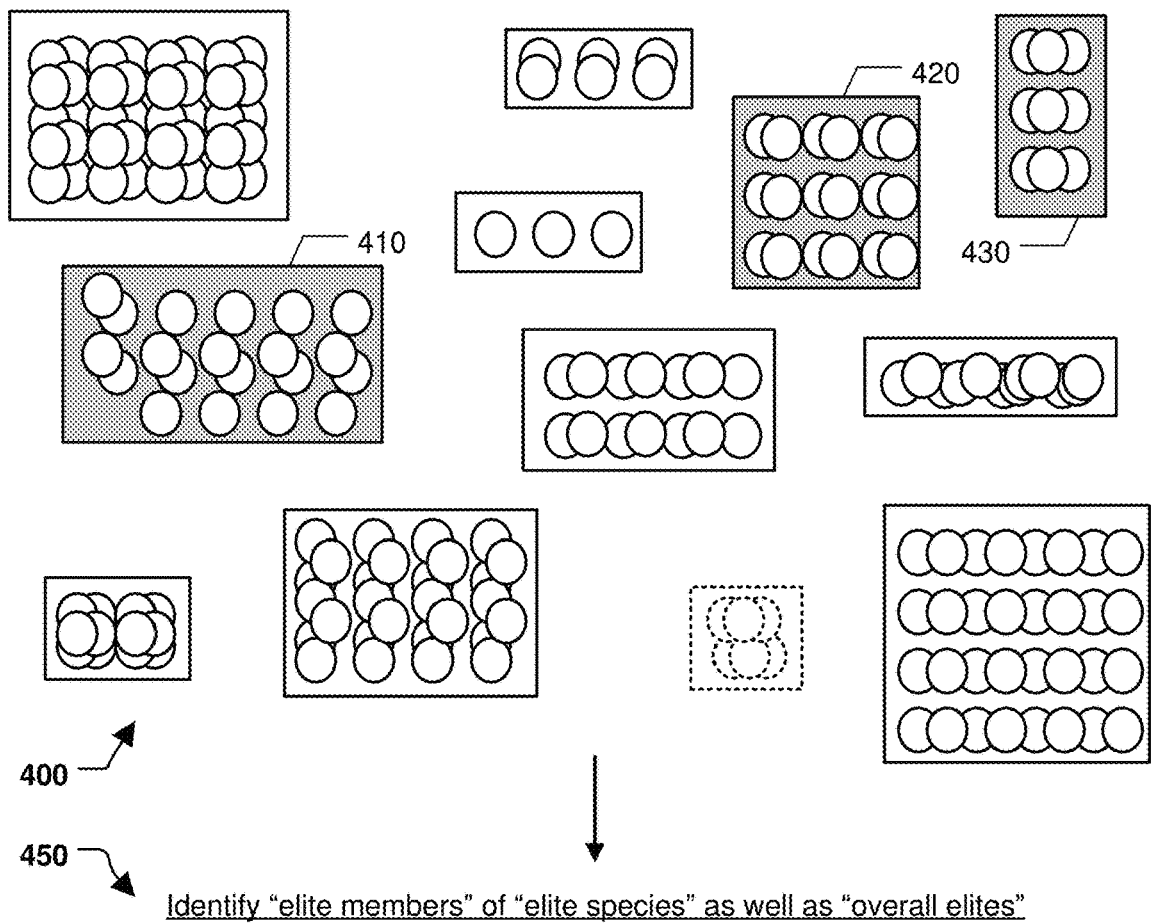
FIG. 4 illustrates particular examples of third and fourth stages of operation at the system of FIG. 1.
Figure 4:
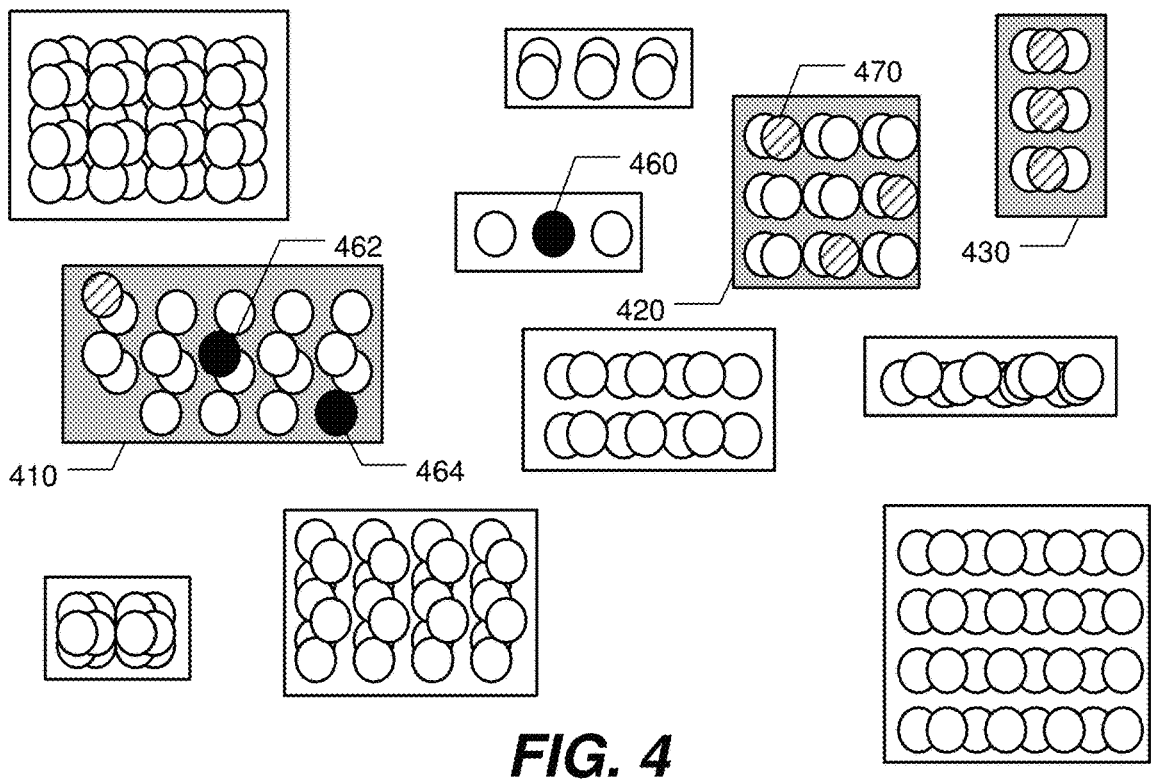

Continuing to FIG. 4, during a third stage 400 and a fourth stage 450 of operation, a species score may be determined for each of the species. The species score of a species may be determined based on a species fitness of the species, a species diversity value of the species, or both. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 110 may maintain a data structure that tracks the fitness of each species across multiple epochs. Additionally, or alternatively, the genetic algorithm 110 may maintain a data structure that tracks the diversity value of each species across multiple epochs. Based on the species score, the genetic algorithm 110 may identify the "fittest" species, shaded and denoted in FIG. 4 as "elite species." Although three elite species 410, 420, and 430 are shown in FIG. 4, it is to be understood that in alternate examples a different number of elite species may be identified.

In a particular aspect, the genetic algorithm 110 uses species fitness to determine if a species has become stagnant and is therefore to become extinct. As an illustrative non-limiting example, the stagnation criterion 150 may indicate that a species has become stagnant if the fitness of that species remains within a particular range (e.g., +/−5%) for a particular number (e.g., 5) epochs. If a species satisfies a stagnation criterion, the species and all underlying models may be removed from the genetic algorithm 110. In the illustrated example, species 360 of FIG. 3 is removed, as shown in the third stage 400 through the use of broken lines.

Proceeding to the fourth stage 450, the fittest models of each "elite species" may be identified. The fittest models overall may also be identified. In the illustrated example, the three fittest models of each "elite species" are denoted "elite members" and shown using a hatch pattern. Thus, model 470 is an "elite member" of the "elite species" 420. The three fittest models overall are denoted "overall elites" and are shown using black circles. Thus, models 460, 462, and 464 are the "overall elites" in the illustrated example. As shown in FIG. 4 with respect to the model 460, an "overall elite" need not be an "elite member," e.g., may come from a non-elite species. In an alternate implementation, a different number of "elite members" per species and/or a different number of "overall elites" may be identified.

Figure 5:
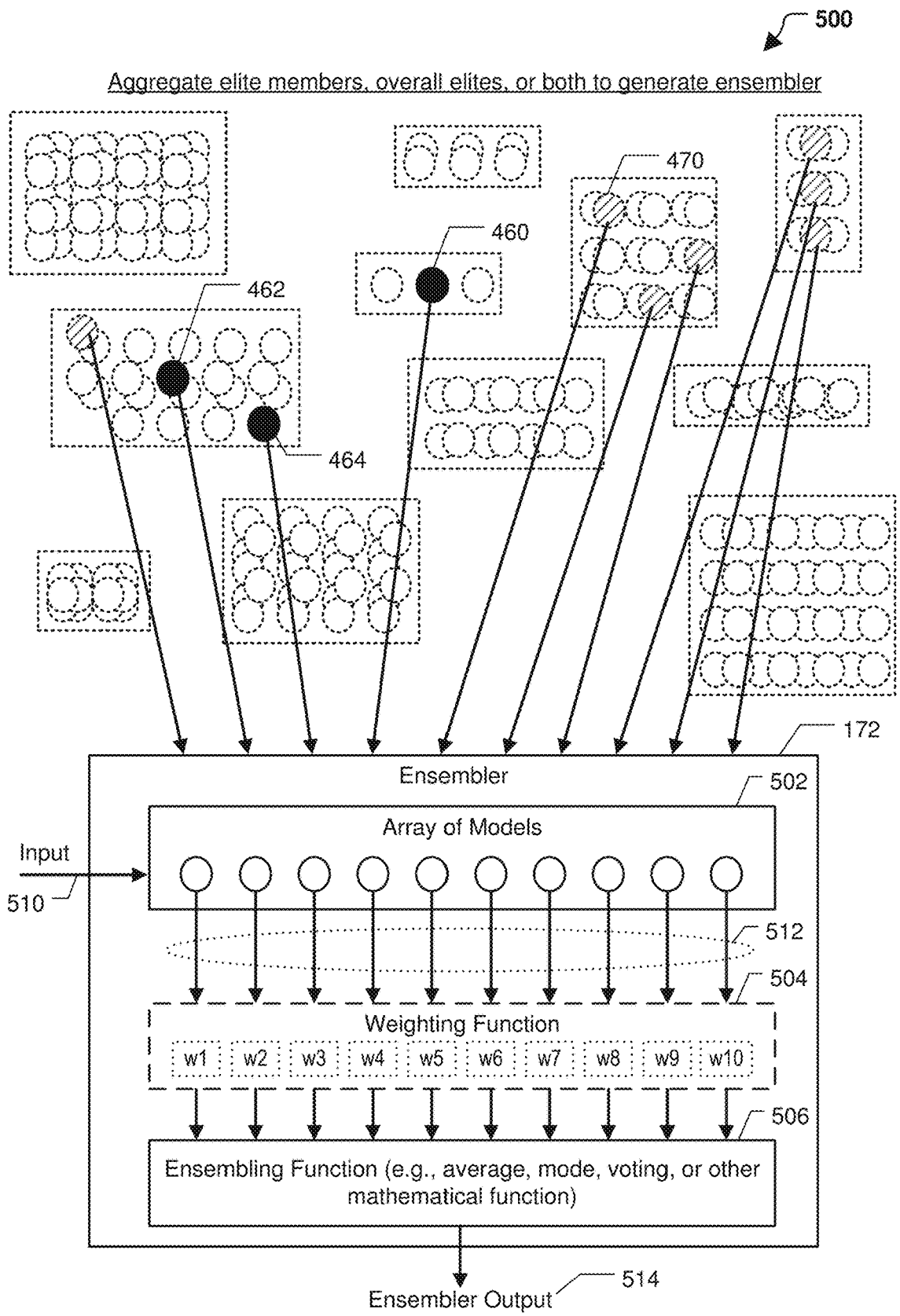
FIG. 5 illustrates a particular example of a fifth stage of operation at the system of FIG. 1.

Continuing to FIG. 5, during a fifth stage 500 of operation, a subset of models of the input set may be aggregated to form the ensembler 172. In a particular implementation, the subset of models includes the "overall elite" models 460, 462, and 464. For example, a particular number of the fittest models, or all models having a fitness that exceeds a threshold, may be selected as the subset of models. In another particular implementation, the subset of models includes the "elite members" including the model 470 of the "elite species." For example, the fitness of the species may be determined, and an "elite member" (or a particular number of "elite members") of each "elite species" may be selected as the subset of models. In another particular implementation, as illustrated in FIG. 5, the subset of models includes the "overall elite" models 460, 462, and 464 and the "elite members" of the "elite species" (including the model 470). Additionally, or alternatively, the subset of models may include models that have relatively high values of one or more diversity metrics (or the "elite members" and the "overall elites" may be determined based at least in part on one or more diversity metrics). As a particular example, the diversity metrics may indicate a suitability of the corresponding model to represent one or more portions of an input data set well (e.g., within a target range). To illustrate, the subset of models may include ten models, and each of the ten models may represent one of ten portions of an input data set well (e.g., within a target range). In other implementations, other diversity metrics may be used. Although ten models are illustrated as being included in the array of models 502, in other implementations, the array of models 502 may include more than ten or fewer than ten models.

The ensembler 172 may include an array of models 502, an optional weighting function 504, and an ensembling function 506. To illustrate, the model data 174 (of FIG. 1) may correspond to or be indicative of the array of models 502, the ensemble data 176 (of FIG. 1) may correspond to or be indicative of the ensembling function 506, and the weighting data 178 (of FIG. 1) may correspond to or be indicative of weights generated by the weighting function 504. The array of models 502 includes each model of the subset of models (e.g., the "overall elites" and the "elite members").

The ensembler 172 may be configured to receive an input 510 and to generate an ensembler output 514 based on the input 510. To illustrate, the ensembler 172 may be configured to provide at least a portion of the input 510 to each model of the array of models 502 (e.g., the subset of models that are aggregated to form the ensembler 172) to generate a plurality of intermediate outputs 512. For example, the input 510 may include a data set, and each model (e.g., neural network) of the array of models 502 may receive the data set and generate a result (e.g., a classification) by passing the input set through the corresponding neural network. In this example, the classifications (or other results) generated by the array of models 502 correspond to the plurality of intermediate outputs 512.

The ensembling function 506 is configured to perform a function on the plurality of intermediate outputs 512 to generate a single output (e.g., the ensembler output 514). In a particular implementation, the ensembling function 506 is an average. For example, the ensembler output 514 may include an average of the plurality of intermediate outputs 512. In another particular implementation, the ensembling function 506 is a mode. For example, the ensembler output 514 may include a mode of the intermediate outputs 512. In another particular implementation, the ensembling function 506 is a voting operation. For example, the ensembler output 514 may include an output of a voting operation performed on the plurality of intermediate outputs 512. The voting operation may return a first value if a threshold number (or more) of the plurality of intermediate outputs 512 have a particular value and may return a second value if fewer than the threshold number of the plurality of intermediate outputs 512 have the particular value. In other implementations, the ensembling function 506 may include other functions.

In some implementations, the weighting function 504 applies one or more weights to the plurality of intermediate outputs 512 prior to application of the ensembling function 506. For example, each of the plurality of intermediate outputs 512 may be associated with a corresponding weight. To illustrate, the weighting function 504 may apply a first weight w1 to a first intermediate input, a second weight w2 to a second intermediate output, a third weight w3 to a third intermediate output, a fourth weight w4 to a fourth intermediate output, a fifth weight w5 to a fifth intermediate output, a sixth weight w6 to a sixth intermediate output, a seventh weight w7 to a seventh intermediate output, an eighth weight w8 to an eighth intermediate output, a ninth weight w9 to a ninth intermediate output, and a tenth weight w10 to a tenth intermediate output. The example illustrated in FIG. 5 is illustrative and is not intended to be limiting. In other implementations, the weighting function 504 applies more than ten weights or fewer than ten weights.

The weights applied by the weighting function 504 may be based on various values. In a particular implementation, the weighting function 504 applies weights based on fitness values. For example, the first weight w1 applied to the first intermediate output may be based on a fitness value associated with the first model of the array of models 502. In another particular implementation, the weights applied by the weighting function 504 may be dynamically determined (e.g., defined) based on species score for each species associated with generation of the corresponding intermediate output. In another particular implementation, the weighting function 504 applies weights based on species scores associated with species that include the models of the array of models 502. For example, a weight associated with a particular intermediate output may be based on a species score associated with a species that includes the model that generated the particular intermediate output. To illustrate, the first, second, and third models of the array of models 502 may be associated with a first species, the fourth model of the array of models 502 may be associated with a second species, the fifth, sixth, and seventh models of the array of models 502 may be associated with a third species, and the eighth, ninth, and tenth models of the array of models 502 may be associated with a fourth species. In a particular implementation, weights w1, w2, and w3 may be based on the fitness of the first species, weight w4 may be based on the fitness of the second species, weights w5, w6, and w7 may be based on the fitness of the third species, and weights w8, w9, and w10 may be based on the fitness of the fourth species.

In another particular implementation, the weights may be based on other values besides species fitness values. For example, the genetic algorithm 110 may maintain data structures that include multiple values related to each species, such as a fitness value, a stagnation value, an improvement value, a "long-term" fitness value, a diversity value, etc., and the weighting function 504 may apply weights based on any of these values. For example, outputs of models from species having higher stagnation values (e.g., values indicative of whether the species is stagnating) may be associated with lower weights than outputs of models from species with lower stagnation values. As another example, outputs of models from species having higher improvement values (e.g., values indicating that a fitness or other metric is increasing) may be associated with higher weights than outputs of models from species with lower improvement values. As yet another example, outputs of models from species having higher long-term fitness values (e.g., values indicative of a fitness over multiple epochs) may be associated with higher weights than outputs of models from species having lower long-term fitness values. In other implementations, the weighting function 504 may apply weights to the plurality of intermediate outputs 512 that are based on other values or characteristics.

In a particular implementation, the ensembler 172 corresponds to an output model of the genetic algorithm 110. To illustrate, the ensembler 172 may be generated during a final epoch of the genetic algorithm 110 and provided as an output (e.g., instead of outputting a selected model, such as an overall fittest model). The ensembler 172 may be executed on one or more input data sets to generate one or more outputs. Because the ensembler output 514 is based on the outputs of multiple different models (e.g., neural networks), the ensembler 172 may be more likely to avoid overfitting to the data sets used during training than a single model. Thus, executing the ensembler 172 on an input data set may give a more "generalized" result than executing a single model on the input data set, in at least some circumstances. In an alternate implementation, the ensembler 172 and one or more selected models may be provided as the output.

In an alternate implementation, the ensembler 172 may be generated during a first epoch of the genetic algorithm 110 and may be input to a second epoch of the genetic algorithm 110. The second epoch is subsequent to the first epoch. In a particular implementation, the first epoch and the second epoch are consecutive epochs (e.g., the second epoch immediately follows the first epoch). Alternatively, the first epoch and the second epoch may be separated by at least one epoch. Providing the ensembler 172 as an input to a subsequent epoch allows the ensembler 172 to be treated as a model that may undergo one or more genetic operations, as further described herein. Adding the ensembler 172 to the models that are "evolved" during the course of the genetic algorithm 110 may cause the genetic algorithm 110 to converge faster or to converge to a result (e.g., a neural network) having a higher fitness than if the ensembler 172 is not used as a model during one or more epochs of the genetic algorithm 110. Instead of being executed on data sets to generate a final output, in these implementations, the ensembler 172 may be executed on an input data set to determine a fitness of the ensembler 172, such as during fitness determination of the other models.

Figure 6:
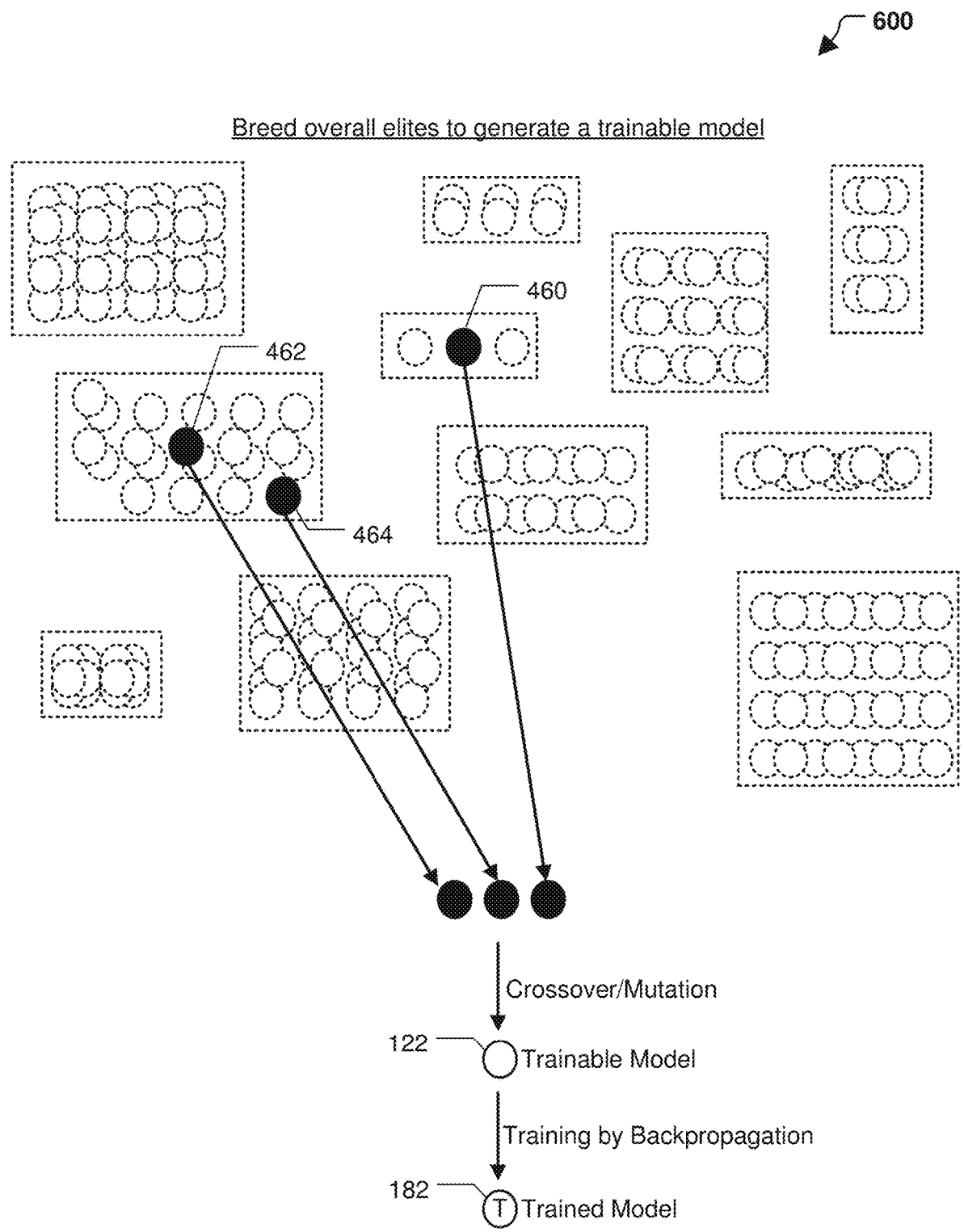
FIG. 6 illustrates a particular example of a sixth stage of operation at the system of FIG. 1.

Referring now to FIG. 6, during an optional sixth stage 600 of operation, the "overall elite" models 460, 462, and 464 may be genetically combined to generate the trainable model 122. For example, genetically combining models may include crossover operations in which a portion of one model is added to a portion of another model, as further illustrated in FIG. 7. As another example, a random mutation may be performed on a portion of one or more of the "overall elite" models 460, 462, 464 and/or the trainable model 122. The trainable model 122 may be sent to the backpropagation trainer 180, as described with reference to FIG. 1. The backpropagation trainer 180 may train connection weights of the trainable model 122 based on a portion of the input data set 102. When training is complete, the resulting trained model 182 may be received from the backpropagation trainer 180 and may be input into a subsequent epoch of the genetic algorithm 110. In some implementations, the ensembler 172 is generated during the subsequent epoch, and thus at least one model of the subset of models that is aggregated to form the ensembler 172 may include a trained model. In other implementations, the ensembler 172 is provided to the backpropagation trainer 180, and the backpropagation trainer 180 performs backpropagation training on the ensembler 172 to generate the trained model 182. Although described with respect to the initial epoch, in other implementations, the trainable model 122 is not generated and provided to the backpropagation trainer 180 until a later epoch.

Figure 7:
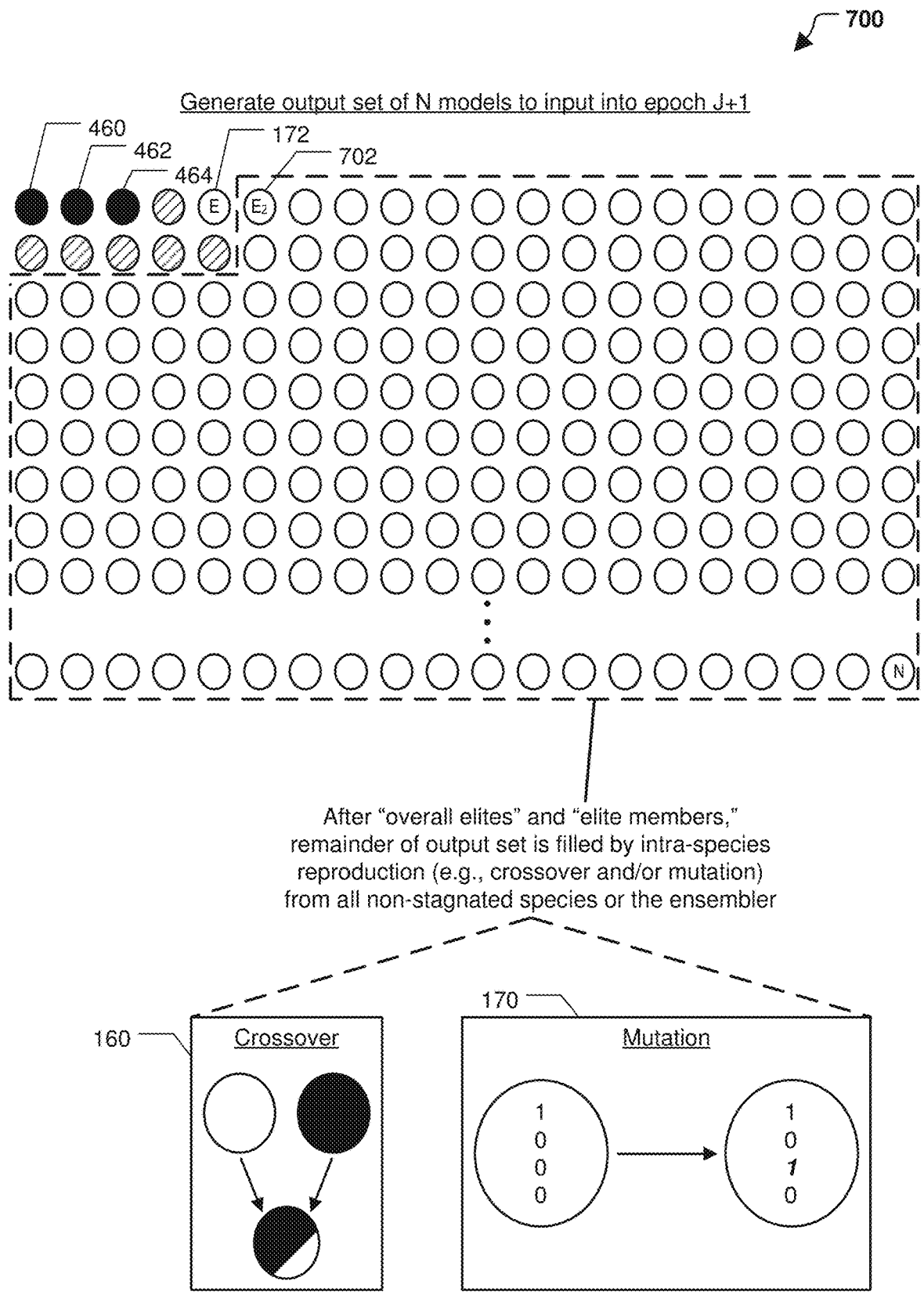
FIG. 7 illustrates a particular example of a seventh stage of operation at the system of FIG. 1.

Continuing to FIG. 7, while the backpropagation trainer 180 trains the trainable model, the output set 130 of the epoch may be generated in a seventh stage 700 of operation. In the illustrated example, the output set 130 includes the same number of models, e.g., 200 models, as the input set 120. The output set 130 may include each of the "overall elite" models 460-464. The output set 130 may also include each of the "elite member" models, including the model 470. Propagating the "overall elite" and "elite member" models to the next epoch may preserve the "genetic traits" that resulted in such models being assigned high fitness values. The output set 130 may also include the ensembler 172, as described with reference to FIG. 5.

The rest of the output set 130 may be filled out by intra-species reproduction using the crossover operation 160 and/or the mutation operation 170. In the illustrated example, the output set 130 includes 9 "overall elite" and "elite member" models and the ensembler 172, so the remaining 190 models may be generated based on intra-species reproduction using the crossover operation 160 and/or the mutation operation 170. After the output set 130 is generated, the output set 130 may be provided as the input set 120 for the next epoch of the genetic algorithm 110.

During the crossover operation 160, a portion of one model may be combined with a portion of another model, where the size of the respective portions may or may not be equal. To illustrate with reference to the model "encodings" described with respect to FIG. 1, the crossover operation 160 may include concatenating bits 0 to p of one bit string with bits p+1 to q of another bit string, where p and q are integers and p+q is equal to the total size of a bit string that represents a model resulting from the crossover operation 160. When decoded, the resulting bit string after the crossover operation 160 produces a neural network that differs from each of its "parent" neural networks in terms of topology, activation function, aggregation function, bias value/function, link weight, or any combination thereof.

Thus, the crossover operation 160 may be a random or pseudo-random biological operator that generates a model of the output set 130 by combining aspects of a first model of the input set 120 with aspects of one or more other models of the input set 120. For example, the crossover operation 160 may retain a topology of hidden nodes of a first model of the input set 120 but connect input nodes of a second model of the input set 120 to the hidden nodes. As another example, the crossover operation 160 may retain the topology of the first model of the input set 120 but use one or more activation functions of the second model of the input set 120. In other implementations, the crossover operation 160 may combine layer parameters of two models. For example, the crossover operation 160 may retain a number of models in a layer but change a layer type (e.g., from a LSTM layer to a GRU layer, as a non-limiting example). As another example, the crossover operation 160 may retain a layer type but change connections with an input layer. In some aspects, rather than operating on models of the input set 120, the crossover operation 160 may be performed on a model (or models) generated by mutation of one or more models of the input set 120. For example, the mutation operation 170 may be performed on a first model of the input set 120 to generate an intermediate model and the crossover operation 160 may be performed to combine aspects of the intermediate model with aspects of a second model of the input set 120 to generate a model of the output set 130.

During the mutation operation 170, a portion of a model may be randomly modified. The frequency of mutations may be based on a mutation probability metric, which may be user-defined or randomly selected/adjusted. To illustrate with reference to the model "encodings" described with respect to FIG. 1, the mutation operation 170 may include randomly "flipping" one or more bits a bit string.

The mutation operation 170 may thus be a random or pseudo-random biological operator that generates or contributes to a model of the output set 130 by mutating any aspect of a model of the input set 120. For example, the mutation operation 170 may cause the topology a particular model of the input set 120 to be modified by addition or omission of one or more input nodes, by addition or omission of one or more connections, by addition or omission of one or more hidden nodes, or a combination thereof. As another example, the mutation operation 170 may cause one or more activation functions, aggregation functions, bias values/functions, and/or or connection weights to be modified. In other implementations, the mutation operation 170 may modify a layer parameter of a model. For example, the mutation operation 170 may modify a number of models in the layer. As another example, the mutation operation 170 may change a layer type (e.g., from a GRU layer to a CNN layer, as a non-limiting example). In some aspects, rather than operating on a model of the input set 120, the mutation operation 170 may be performed on a model generated by the crossover operation 160. For example, the crossover operation 160 may combine aspects of two models of the input set 120 to generate an intermediate model and the mutation operation 170 may be performed on the intermediate model to generate a model of the output set 130.

In addition to being performed on the models, at least one genetic operation may be performed on the ensembler 172 to generate a second ensembler 702. The at least one genetic operation may include the crossover operation 160, the mutation operation 170, or both. To illustrate, the ensembler 172 may be serialized into a bit string that represents the ensembler 172, similar to the models being serialized into corresponding bit strings. For example, a portion of the bit string may indicate the model data 174, a portion of the bit string may represent the ensemble data 176, and a portion of the bit string may represent the weight data 178. The mutation operation 170 may mutate an aspect of the ensembler 172 to generate the second ensembler 702, such as changing the number of models in the array of models 502, changing the weighting function 504, or changing the ensembling function 506, as non-limiting examples. Additionally, or alternatively, the crossover operation 160 may combine an aspect of another model (or another ensembler) with the ensembler 172 to generate the second ensembler 702. In a particular implementation, the crossover operation 160 is performed on the ensembler 172 and other ensemblers (e.g., ensemblers generated by the mutation operation 170). To illustrate, an aspect of another ensembler may be combined with the ensembler 172 to generate the second ensembler 702. For example, the crossover operation 160 may retain the number of models in the array of models 502 of the ensembler 172 but use an ensembling function of another ensembler. In other implementations, the crossover operation 160 may be performed on the ensembler 172 and on a different model. In some implementations, the bit string representing the ensembler 172 may be filtered or concatenated to generate a partial bit string that has the same size as a bit string representing a model prior to performing the crossover operation 160. Alternatively, the crossover operation 160 may be performed on bit strings having different sizes. After generation, the second ensembler 702 may be executed on an input data set to generate an output. For example, the second ensembler 702 may be executed on the input data set to determine a fitness of the second ensembler 702.

The genetic algorithm 110 may continue in the manner described above through multiple epochs. In some implementations, when the genetic algorithm 110 receives the trained model 182, the trained model 182 may be provided as part of the input set 120 of a Kth epoch, as shown in an eighth stage 800 of FIG. 8. For example, the trained model 182 may replace one of the other 200 models in the input set 120 or may be a 201' model of the input set (e.g., in some epochs, more than 200 models may be processed). In some implementations, the input set includes at least one ensembler, such as a Yth ensembler 802, that is generated by aggregating models of the input set or that is generated by performing one or more genetic operations on another ensembler (e.g., the ensembler 172 or the second ensembler 702). During training by the backpropagation trainer 180, the genetic algorithm 110 may have advanced one or more epochs. Thus, when the trained model 182 is received, the trained model 182 may be inserted as input into an epoch subsequent to the epoch during which the corresponding trainable model 122 was provided to the backpropagation trainer 180. To illustrate, if the trainable model 122 was provided to the backpropagation trainer 180 during epoch J, then the trained model 182 may be input into epoch K, where K=J+X. In other implementations, the input set 120 of the eighth stage 800 of FIG. 8 does not include any trained model 182 and optimization training is not performed during execution of the genetic algorithm 110.

Figure 8:
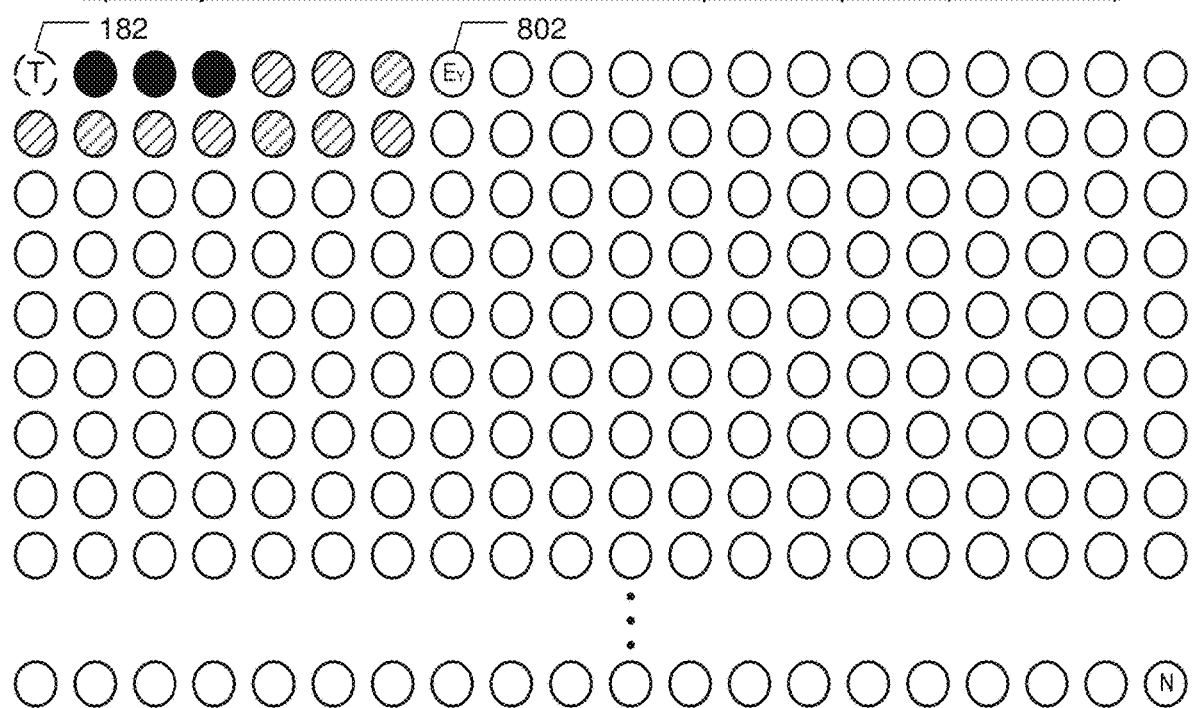
FIG. 8 illustrates a particular example of an eighth stage of operation at the system of FIG. 1.

In the example of FIGS. 6 and 8, a single trainable model 122 is provided to the backpropagation trainer 180 and a single trained model 182 is received from the backpropagation trainer 180. When the trained model 182 is received, the backpropagation trainer 180 becomes available to train another trainable model. Thus, because training takes more than one epoch, trained models 182 may be input into the genetic algorithm 110 sporadically rather than every epoch after the initial epoch. In some implementations, the backpropagation trainer 180 may have a queue or stack of trainable models 122 that are awaiting training. The genetic algorithm 110 may add trainable models 122 to the queue or stack as they are generated and the backpropagation trainer 180 may remove a trainable model 122 from the queue or stack at the start of a training cycle. In some implementations, the system 100 includes multiple backpropagation trainers 180 (e.g., executing on different devices, processors, cores, or threads). Each of the backpropagation trainers 180 may be configured to simultaneously train a different trainable model 122 to generate a different trained model 182. In such examples, more than one trainable model 122 may be generated during an epoch and/or more than one trained model 182 may be input into an epoch.

Operation at the system 100 may continue iteratively until specified a termination criterion, such as a time limit, a number of epochs, or a threshold fitness value (of an overall fittest model) is satisfied. In some implementations, when the termination criterion is satisfied, an overall fittest model of the last executed epoch may be selected and output as representing a neural network that best models the input data set 102. In some examples, the overall fittest model may undergo a final training operation (e.g., by the backpropagation trainer 180) before being output. Alternatively, an ensembler generated during the last executed epoch may be selected and output as an output of the genetic algorithm 110.

Although various aspects are described with reference to a backpropagation training, it is to be understood that in alternate implementations different types of training may also be used in the system 100. For example, models may be trained using a genetic algorithm training process. In this example, genetic operations similar to those described above are performed while all aspects of a model, except for the connection weight, are held constant.

Performing genetic operations may be less resource intensive than evaluating fitness of models and training of models using backpropagation. For example, both evaluating the fitness of a model and training a model include providing the input data set 102, or at least a portion thereof, to the model, calculating results of nodes and connections of a neural network to generate output data, and comparing the output data to the input data set 102 to determine the presence and/or magnitude of an error. In contrast, genetic operations do not operate on the input data set 102, but rather merely modify characteristics of one or more models. However, as described above, one iteration of the genetic algorithm 110 may include both genetic operations and evaluating the fitness of every model and species. Training trainable models generated by breeding the fittest models of an epoch may improve fitness of the trained models without requiring training of every model of an epoch. Further, the fitness of models of subsequent epochs may benefit from the improved fitness of the trained models due to genetic operations based on the trained models. Accordingly, training the fittest models enables generating a model with a particular error rate in fewer epochs than using genetic operations alone. As a result, fewer processing resources may be utilized in building highly accurate models based on a specified input data set 102.

The system 100 of FIG. 1 may thus support cooperative, data-driven execution of a genetic algorithm and a backpropagation trainer to automatically arrive at an output neural network model of an input data set. The system of FIG. 1 may arrive at the output neural network model faster than using a genetic algorithm or backpropagation alone and with reduced cost as compared to hiring a data scientist. In some cases, the neural network model output by the system 100 may also be more accurate than a model that would be generated by a genetic algorithm or backpropagation alone. The system 100 may also provide a problem-agnostic ability to generate neural networks. For example, the system 100 may represent a single automated model building framework that is capable of generating neural networks for at least regression problems, classification problems, and reinforcement learning problems. Further, the system 100 may enable generation of a generalized neural network that demonstrates improved adaptability to never-before-seen conditions. To illustrate, the neural network may mitigate or avoid overfitting to an input data set and instead may be more universal in nature. Thus, the neural networks generated by the system 100 may be capable of being deployed with fewer concerns about generating incorrect predictions. In some implementations, the neural networks generated by the system 100 may be generated faster, or may have improved fitness, because one or more ensemblers are used as models during execution of a genetic algorithm. In other implementations, the system 100 outputs an ensembler (e.g., instead of a selected neural network). Because the ensembler generates an output based on outputs of multiple different neural networks, the ensembler may be more "generalized" (e.g., more universal in nature) and thus more likely to avoid overfitting to an input data set.

It will be appreciated that the systems and methods of the present disclosure may be applicable in various scenarios, infrastructures, and data environments. As an illustrative non-limiting example, the input data set 102 may include timestamped data from a large array of sensors distributed around a wind farm and may also include timestamped uptime/downtime data of individual wind turbines. The system 100 may generate a neural network model that is configured to predict how likely a wind turbine is to fail. The neural network model may, in a particular example, increase failure lead time from 3-5 days to 30-40 days, which can result in reduced downtime and monetary savings for an operator of the wind farm. The system 100 may be capable of automatically building similar kinds of models that predict numerical values or states (e.g., failures) for internet of things (IoT), utilities, and oil/gas infrastructures.

As another illustrative non-limiting example, the input data set 102 may include health data and the system 100 may automatically build a model to predict whether a patient exhibiting certain health conditions is likely to have a particular ailment. As another illustrative non-limiting example, the input data set 102 may include financial data and the system 100 may automatically build a model to forecast market conditions. As another illustrative non-limiting example, the input data set 102 may include network security, network log, and/or malware data, and the system 100 may automatically build a model to implement firewall filtering rules, endpoint anti-malware detection, a bot/botnet detector, etc.

As another illustrative non-limiting example, the system 100 may generate a neural network to output aircraft autopilot operations (e.g. throttle, steer, flaps, etc.) based on reinforcement learning. In such an example, the reward function optimized by the neural network may involve aircraft altitude, aircraft distance traveled, etc. As yet another example, the system 100 may generate a neural network to predict oil/gas industry workover events (e.g., events that lead to major maintenance or remedial operations on a rig or well, which can lead to considerable production time lost and expense incurred).

Yet another example of a problem set that can be solved with neural networks generated with the system 100 described herein is data fusion. In this case, data aggregated from a large number of sensors of various types, including multiple sensors of the same type, is collected and used to identify an object, action or phenomenon that would not be entirely detectable with any one sensor or with a small subset of sensors. For example, the detection of a submarine may be performed based on the inputs received from multiple sonar buoys which provide input to the generated neural network. Another example may be the identification of a particular type of aircraft based on both the audio signature and a visual view (which may be partially obscured or have a low resolution).

Figure 9A:
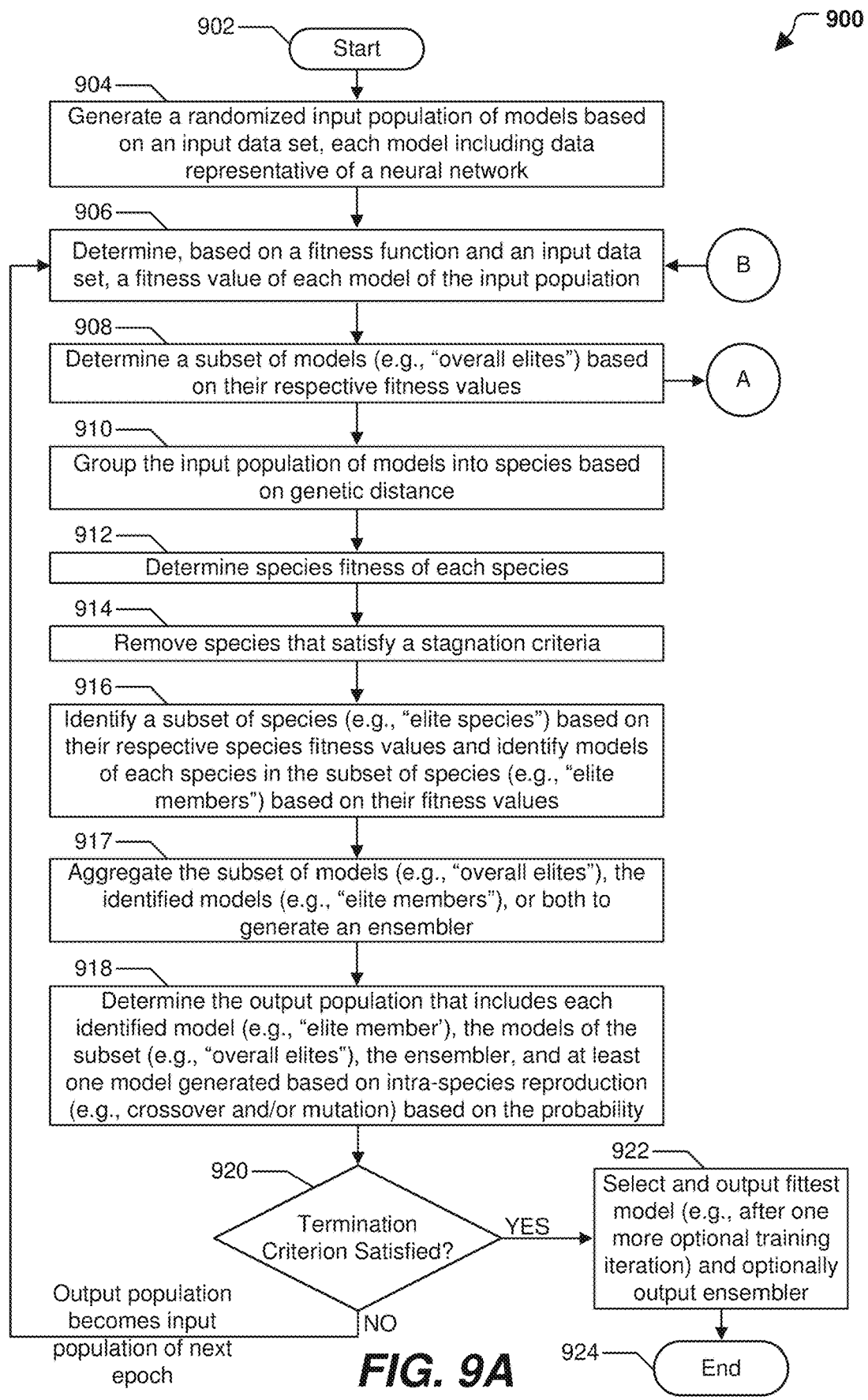
FIGS. 9A and 9B collectively illustrate a particular example of a method of cooperative execution of a genetic algorithm and a backpropagation trainer.
Figure 9B:
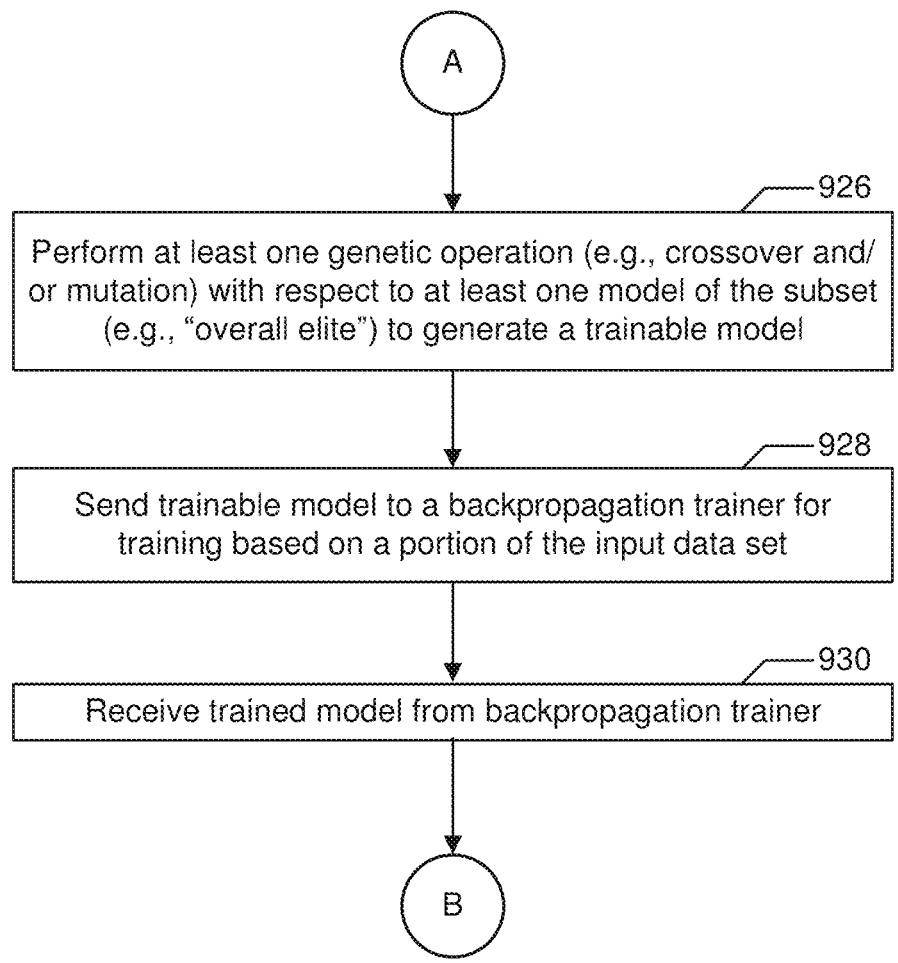

FIGS. 9A and 9B depict a particular example of a method 900 of cooperative execution of a genetic algorithm and a backpropagation trainer. In an illustrative example, the method 900 may be performed at the system 100 of FIG. 1.

The method 900 may start, at 902, and may include generating a randomized input population of models based on an input data set, at 904. Each model may include data representative of a neural network. For example, each model may include at least node data and connection data, as described with reference to FIGS. 1 and 2. Further, each of the models may be part of the input set 120 of FIG. 1 and may model the input data set 102 of FIG. 1.

The method 900 may also include determining, based on a fitness function, a fitness value of each model of the input population, at 906. For example, the fitness of each model of the input set 120 may be determined, as described with reference to FIGS. 1 and 3.

The method 900 may further include determining a subset of models based on their respective fitness values, at 908. The subset of models may be the fittest models of the input population, e.g., "overall elites." For example, "overall elites" may be determined as described with reference to FIGS. 1 and 4.

The method 900 may include performing multiple sets of operations at least partially concurrently. In a particular implementation, continuing to 926 (in FIG. 9B), the method 900 may include performing at least one genetic operation with respect to at least one model of the subset to generate a trainable model. For example, the crossover operation 160 and/or the mutation operation 170 may be performed with respect to the "overall elites" to generate the trainable model 122, as described with reference to FIGS. 1, 4, 6, and 7. Alternatively, an ensembler may be provided as the trainable model. For example, the ensembler 172 of FIG. 5 may be provided as the trainable model. The method 900 may also include sending the trainable model to a backpropagation trainer (or other optimization trainer) for training based on a portion of the input data set, at 928. For example, the backpropagation trainer 180 of FIG. 1 may train the trainable model 122 based on a portion of the input data set 102 to generate the trained model 182, as described with reference to FIGS. 1 and 6.

The genetic algorithm may continue while backpropagation training occurs (in implementations that include backpropagation training). For example, the method 900 may include grouping the input population of models into species based on genetic distance, at 910, and determining species fitness of each species, at 912. To illustrate, the models of the input set 120 may be grouped into species and species fitness may be evaluated as described with reference to FIGS. 1, 3, and 4.

Continuing to 914, species that satisfy a stagnation criterion may be removed. For example, species satisfying the stagnation criterion 150 may be removed, as described with reference to FIGS. 1 and 4. At 916, the method 900 may include identifying a subset of species based on their respective fitness values and identifying models of each species in the subset based on their respective model fitness values. The subset of species may be the fittest species of the input population, e.g., "elite species," and the identified models of the "elite species" may be the fittest members of those species, e.g., "elite members." For example, species fitness values, "elite species," and "elite members" may be determined as described with reference to FIGS. 1 and 4.

The method 900 may include aggregating the "overall elites," the "elite members," or both, to generate an ensembler, at 917. For example, a subset of models (e.g., the "overall elites," the "elite members", or both) may be aggregated to form the ensembler 172 that includes the model data 174 indicative of the array of models 502 (e.g., the subset of models) and the ensemble data 176 indicative of the ensembling function 506 (and optionally the weight data 178 indicative of the weighting function 504), as described with reference to FIGS. 1 and 5.

The method 900 may include determining an output population that includes each "elite member," the "overall elites," the ensembler, and at least one model that is generated based on intra-species reproduction, at 918. For example, the models of the output set 130 of FIG. 1 may be determined, where the output set 130 includes the "overall elite" models 460-464, the elite members (including the model 470), the ensembler 172, and at least one model generated based on intra-species reproduction using the crossover operation 160 and/or the mutation operation 170, as described with reference to FIGS. 1 and 7. In other implementations, the ensembler is not included in the output population and instead is provided as an output of the genetic algorithm, as further described herein.

The method 900 may include determining whether a termination criterion is satisfied, at 920. The termination criterion may include a time limit, a number of epochs, or a threshold fitness value of an overall fittest model, as illustrative non-limiting examples. If the termination criterion is not satisfied, the method 900 returns to 906 and a next epoch of the genetic algorithm is executed, where the output population determined at 918 is the input population of the next epoch.

As described above, while the genetic algorithm is ongoing, the backpropagation trainer may train the trainable model to generate a trained model. When training is complete, the method 900 may include receiving the trained model from the backpropagation trainer (or other optimization trainer), at 930 (in FIG. 9B). The trained model may be added to the input set of an epoch of the genetic algorithm, as shown in FIG. 9B.

When the termination criterion is satisfied, at 920, the method 900 may include selecting and outputting a fittest model and optionally outputting the ensembler, at 922, and the method 900 may end, at 924. In some implementations, the ensembler is used as a model to be evolved during execution of the genetic algorithm (e.g., the ensembler is provided as part of the output population at 918). In other implementations, the ensembler is output in addition to the selected model at 922. In some implementations, the selected model may be subjected to a final training operation, e.g., by the backpropagation trainer or by another trainer, before being output.

FIG. 10 depicts a particular example of a method 1000 of generating an ensembler using models of a genetic algorithm. In an illustrative example, the method 1000 may be performed at the system 100 of FIG. 1.

The method 1000 includes determining, by a processor of a computing device, a subset of models, at 1002. The subset of models is included in a plurality of models generated based on a genetic algorithm and corresponding to a first epoch of the genetic algorithm. Each of the plurality of models includes data representative of a neural network. To illustrate, a subset of models of an input set of the first epoch is selected. The subset of models may be selected based on fitness values. For example, the subset of models may include the "overall elites" 460, 462, and 464, the "elite members" of the elite species (including the model 470), or both, as described with reference to FIG. 5.

The method 1000 includes aggregating the subset of models to generate an ensembler, at 1004. For example, the subset of models may be aggregated to form the ensembler 172 of FIGS. 1 and 5. The ensembler, when executed on an input, provides at least a portion of the input to each model of the subset of models to generate a plurality of intermediate outputs. An ensembler output of the ensembler is based on the plurality of intermediate outputs. To illustrate, the ensembler 172, when executed on the input 510, provides at least a portion of the input 510 to each model of the subset of models (e.g., the array of models 502) to generate the plurality of intermediate outputs 512, and the ensembler output 514 is based on the plurality of intermediate outputs 512 (e.g., after application of the weighting function 504 and the ensembling function 506).

The method 1000 further includes executing the ensembler on input data to determine the ensembler output, at 1006. For example, the ensembler may include or correspond to the ensembler 172 of FIGS. 1 and 5 that generates the ensembler output 514 having a particular value when the ensembler 172 is executed on the input 510. The ensembler may be executed on the input data to determine a fitness of the ensembler or to determine an overall output based on the input data.

In a particular implementation, the ensembler includes model data indicative of the subset of models and ensemble data indicative of one or more operations performed on the plurality of intermediate outputs to generate the ensembler output. For example, the ensembler 172 includes the model data 174 indicative of the array of models 502 and the ensemble data 176 indicative of the ensembling function 506.

In another particular implementation, the ensembler is input into a second epoch of the genetic algorithm, the second epoch subsequent to the first epoch. For example, the ensembler 172 may be provided as part of an input set, as described with reference to FIG. 6. In a particular implementation, the first epoch and the second epoch are separated by at least one epoch. Alternatively, the first epoch and the second epoch may be consecutive epochs. In an alternative implementation, the ensembler corresponds to an output model of the genetic algorithm. For example, instead of being provided as an input set to a subsequent epoch, the ensembler 172 may be generated during a last executed epoch of the genetic algorithm 110 and may be provided as an output.

In another particular implementation, the subset of models includes elite members of multiple species. For example, the subset of models (e.g., the array of models 502) may include the "elite members" of the "elite species", including the model 470. The method 1000 may include grouping the models of the plurality of models into species based on genetic distance between models, determining a species fitness value of each of the species, determining the elite species based on their respective species fitness values, determining a fitness value of each member of the elite species, and identifying the elite members of each elite species based on their respective fitness values. For example, the models may be grouped into species during the second stage 350, the fitness values of the species may be determined based on the fitness function 140, the "elite species" may be identified, the fitness values of the members of the "elite species" may be determined based on the fitness function 140, and the "elite members" of the "elite species" may be determined, as described with reference to FIGS. 3 and 4.

In another particular implementation, the subset of models includes a plurality of overall elites of the plurality of models. For example, the subset of models (e.g., the array of models 502) include the "overall elites" 460, 462, and 464. The method 1000 may include determining a fitness value of each model of the plurality of models and identifying the overall elites based on their respective fitness values. For example, the fitness values of the models may be determined based on the fitness function 140 to determine the "overall elites" 460, 462, and 464, as described with reference to FIG. 4.

In another particular implementation, the method 1000 includes performing at least one genetic operation on the ensembler to generate a second ensembler during a second epoch of the genetic algorithm that is subsequent to the first epoch. For example, at least one genetic operation may be performed on the ensembler 172 to generate the second ensembler 702, as described with reference to FIG. 7. The at least one genetic operation includes crossover, mutation, or a combination thereof. For example, the at least one genetic operation may include the crossover operation 160, the mutation operation 170, or both, as described with reference to FIG. 7. In some implementations, the method 1000 further includes executing the second ensembler on the input data to generate a second ensembler output. For example, the second ensembler 702 may be executed on the input data to generate a second ensembler output as part of determining a fitness of the second ensembler 702.

Thus, the method 1000 enables generation of an ensembler. In some implementations, the ensembler is an output of a genetic algorithm. Because the ensembler generates an output based on outputs of multiple different neural networks, the ensembler may be more "generalized" (e.g., more universal in nature) and thus more likely to avoid overfitting to an input data set. In other implementations, the method 1000 evolves one or more ensemblers during execution of a genetic algorithm, which may cause the genetic algorithm to converge to a result (e.g., a particular neural network) faster, to improve the fitness of the result (e.g., the particular neural network), or both.

It is to be understood that the division and ordering of steps in FIGS. 9A, 9B, and 10 is for illustrative purposes only and is not be considered limiting. In alternative implementations, certain steps may be combined and other steps may be subdivided into multiple steps. Moreover, the ordering of steps may change. For example, the termination criterion may be evaluated after determining the "overall elites," at 908, rather than after determining the output population, at 918.

In conjunction with the described aspects, a computer system may include a memory configured to store an input data set and a plurality of data structures, each of the plurality of data structures including data representative of a neural network. The system also includes a processor configured to execute a recursive search. Executing the recursive search includes, during a first iteration: determining a fitness value for each of the plurality of data structures based on at least a subset of the input data set, aggregating the subset of models to generate an ensembler, and executing the ensembler on input data to determine an ensembler output. The ensembler, when executed on an input, provides at least a portion of the input to each model of the subset of models to generate a plurality of intermediate outputs. The ensembler output of the ensembler is based on the plurality of intermediate outputs.

In conjunction with the described aspects, a method includes determining, by a processor of a computing device, a subset of models. The subset of models is included in a plurality of models generated based on a genetic algorithm and corresponding to a first epoch of the genetic algorithm. Each of the plurality of models includes data representative of a neural network. The method includes aggregating the subset of models to generate an ensembler. The ensembler, when executed on an input, provides at least a portion of the input to each model of the subset of models to generate a plurality of intermediate outputs. An ensembler output of the ensembler is based on the plurality of intermediate outputs. The method also includes executing the ensembler on input data to determine the ensembler output.

In conjunction with the described aspects, a computer-readable storage device stores instructions that, when executed, cause a computer to perform operations including determining a subset of models. The subset of models is included in a plurality of models generated based on a genetic algorithm and corresponding to a first epoch of the genetic algorithm. Each of the plurality of models includes data representative of a neural network. The operations include aggregating the subset of models to generate an ensembler. The ensembler, when executed on an input, provides at least a portion of the input to each model of the subset of models to generate a plurality of intermediate outputs. An ensembler output of the ensembler is based on the plurality of intermediate outputs. The operations also include executing the ensembler on input data to determine the ensembler output. In a particular implementation, at least one model of the plurality of models is received from a backpropagation trainer, the ensembler is provided as an input model to the backpropagation trainer, or both.

The systems and methods illustrated herein may be described in terms of functional block components, screen shots, optional selections and various processing steps. It should be appreciated that such functional blocks may be realized by any number of hardware and/or software components configured to perform the specified functions.

For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A computer system comprising:
   a memory configured to store a plurality of data structures, each of the plurality of data structures including data representative of at least one neural network; and
   a processor configured to:
      determine a first ensembler based on a set of neural networks represented by the plurality of data structures, the first ensembler configured to, when executed on an input, generate an ensembler output based on a plurality of intermediate outputs generated by the neural networks of the set;
      perform a genetic operation on the first ensembler to generate a second ensembler, wherein the genetic operation includes a crossover operation on the first ensembler and a first neural network, wherein the crossover operation includes generating a first bit stream representing at least a portion of the first ensembler, and wherein the crossover operation includes performing crossover on the first bit stream and a second bit stream representing the at least a portion of the first neural network; and
      output a final ensembler based at least in part on the second ensembler.

2. The computer system of claim 1, wherein the first ensembler is configured to generate the ensembler output by providing at least a portion of the input to a plurality of the neural networks of the set to generate the plurality of intermediate outputs and combining the plurality of intermediate outputs via an ensembling function.

3. The computer system of claim 1, wherein the first ensembler is configured to generate the ensembler output based on a voting operation performed on the plurality of intermediate outputs.

4. The computer system of claim 1, wherein each of the plurality of intermediate outputs is associated with a corresponding weight, wherein the first ensembler includes a weight function generated based on the corresponding weights, and wherein the genetic operation comprises a mutation operation on the weight function.

5. The computer system of claim 4, wherein the weight associated with a particular intermediate output is dynamically determined based on species scores of each species associated with the particular intermediate output.

6. The computer system of claim 1, wherein the processor is further configured to provide an input set of models to a genetic algorithm, wherein the set of the neural networks of the first ensembler includes elite members of a population of neural networks based on the input set of models.

7. The computer system of claim 6, wherein the processor is further configured to:
   group the models of the population into species based on genetic distance between the models;
   determine a species score of each of the species, wherein the species score is based on a species fitness value, a species diversity value, or both;
   determine elite species based on respective species scores of the species;
   determine a score of each member of the elite species, wherein the score is based on a fitness value of the member, a diversity value of the member, or both; and
   identify the elite members based on respective scores of each member of the elite species.

8. The computer system of claim 6, wherein the elite members of the population correspond to overall elites of the population.

9. The computer system of claim 8, wherein the processor is further configured to identify the elite members of the population by:
   determining a fitness value of each model of the input set of models; and
   identifying the overall elites based on respective fitness values each model of the input set of models.

10. A method comprising:
   identifying a first data structure that includes data representative of a first neural network;
   identifying a second data structure that includes data representative of a first ensembler that links multiple neural networks and an ensembling function;
   performing a crossover operation on the first data structure and the second data structure to generate a third data structure that includes data representative of a second ensembler, wherein the crossover operation includes:

generating a first bit stream representing at least a portion of the first ensembler;
generating a second bit stream representing at least a portion of the first neural network; and
combining the first bit stream and the second bit stream; and
outputting a final ensembler based at least in part on the second ensembler.

11. The method of claim 10, wherein the crossover operation is performed during a particular epoch of a recursive search and the final ensembler is generated during a subsequent epoch of the recursive search, and wherein the particular epoch and the subsequent epoch are separated by at least one epoch.

12. The method of claim 10, wherein the ensembling function includes a voting function associated with intermediate outputs of the multiple neural networks.

13. The method of claim 10, wherein the ensembling function includes a weight function generated based on weights associated with the multiple neural networks.

14. The method of claim 13, wherein the third data structure is generated further based on a mutation operation performed on the weight function.

15. The method of claim 10, further comprising:
grouping models of a plurality of models into species based on similarities between the models;
determining a species score of each of the species, wherein the species score is based on a species fitness value, a species diversity value, or both; and
generating the first ensembler based on the species scores of the species.

16. The method of claim 15, wherein the ensembling function includes a weight function generated based on species scores of the species.

17. A computer-readable storage device storing instructions that, when executed, cause a computer to perform operations comprising:
identifying a first data structure that includes data representative of a first neural network;
identifying a second data structure that includes data representative of a first ensembler that links multiple neural networks and an ensembling function;
performing a crossover operation on the first data structure and the second data structure to generate a third data structure that includes data representative of a second ensembler, wherein the crossover operation includes generating a first bit stream representing at least a portion of the first ensembler, and wherein the crossover operation includes performing crossover on the first bit stream and a second bit stream representing the at least a portion of the first neural network; and
outputting a final ensembler based at least in part on the second ensembler.

18. The computer-readable storage device of claim 17, wherein the operations further comprise providing the second ensembler as an input model to a backpropagation trainer to generate the final ensembler.

\* \* \* \* \*